(12) United States Patent
Compton

(10) Patent No.: US 9,503,606 B2
(45) Date of Patent: *Nov. 22, 2016

(54) TIME-DELAY-AND-INTEGRATE IMAGE SENSORS HAVING VARIABLE INTEGRATION TIMES

(71) Applicant: Semiconductor Components Industries, LLC, Phoenix, AZ (US)

(72) Inventor: John Thomas Compton, LeRoy, NY (US)

(73) Assignee: SEMICONDUCTOR COMPONENTS INDUSTRIES, LLC, Phoenix, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/625,296

(22) Filed: Sep. 24, 2012

(65) Prior Publication Data
US 2013/0076955 A1    Mar. 28, 2013

Related U.S. Application Data

(60) Provisional application No. 61/540,113, filed on Sep. 28, 2011, provisional application No. 61/540,117, filed on Sep. 28, 2011, provisional application No. 61/540,120, filed on Sep. 28, 2011, provisional application No. 61/541,189, filed on Sep. 30, 2011.

(51) Int. Cl.
| | |
|---|---|
| *H04N 1/193* | (2006.01) |
| *H04N 3/14* | (2006.01) |
| *H04N 5/372* | (2011.01) |
| *H04N 1/40* | (2006.01) |

(52) U.S. Cl.
CPC .......... *H04N 1/193* (2013.01); *H04N 1/40056* (2013.01); *H04N 3/1581* (2013.01); *H04N 5/37206* (2013.01)

(58) Field of Classification Search
CPC ...... H04N 5/335; H04N 5/372; H04N 5/359; H04N 3/1525
USPC .................................................. 348/311, 314
See application file for complete search history.

(56) References Cited

U.S. PATENT DOCUMENTS

| | | | |
|---|---|---|---|
| 4,169,273 A | 9/1979 | Hendrickson | |
| 4,264,930 A | 4/1981 | White | |

(Continued)

FOREIGN PATENT DOCUMENTS

| | | | | |
|---|---|---|---|---|
| CH | EP 1845706 A1 | * | 10/2007 | ............. H04N 3/155 |
| EP | 0471546 A1 | | 2/1992 | |

(Continued)

OTHER PUBLICATIONS

Chen et al., "An Adaptive SensitivityTM TDI CCD Sensor," Proc. SPIE 2950, 4 pages (Dec. 19, 1996).

(Continued)

*Primary Examiner* — Roberto Velez
*Assistant Examiner* — Cynthia Segura

(57) ABSTRACT

In various embodiments, a time-delay-and-integrate (TDI) image sensor includes (i) a plurality of integrating CCDs (ICCDs), arranged in parallel, that accumulate photocharge in response to exposure to light, (ii) electrically coupled to the plurality of ICCDs, a readout CCD (RCCD) for receiving photocharge from the plurality of ICCDs, and (iii) electrically coupled to the RCCD, readout circuitry for converting charge received from the RCCD into voltage.

12 Claims, 11 Drawing Sheets

(56) References Cited

U.S. PATENT DOCUMENTS

| | | | |
|---|---|---|---|
| 4,280,141 A | 7/1981 | McCann et al. | |
| 4,291,239 A | 9/1981 | Weimer | |
| 4,382,267 A | 5/1983 | Angle | |
| 4,489,423 A | 12/1984 | Suzuki | |
| 4,694,316 A | 9/1987 | Chabbal | |
| 4,695,889 A | 9/1987 | Portmann | |
| 4,758,895 A | 7/1988 | Elabd | |
| 4,803,710 A | 2/1989 | Elabd | |
| 4,809,073 A * | 2/1989 | Chiba | H04N 3/1556 348/299 |
| 4,870,293 A | 9/1989 | Elabd | |
| 4,910,693 A | 3/1990 | Sperling et al. | |
| 5,012,343 A | 4/1991 | Jensen | |
| 5,040,057 A | 8/1991 | Gilblom et al. | |
| 5,047,862 A * | 9/1991 | Stevens | H01L 27/14831 257/230 |
| 5,101,108 A | 3/1992 | Gaalema et al. | |
| 5,131,755 A | 7/1992 | Chadwick et al. | |
| 5,173,748 A | 12/1992 | Bilhorn | |
| 5,173,756 A | 12/1992 | Wong et al. | |
| 5,225,694 A | 7/1993 | Tajime et al. | |
| 5,326,997 A * | 7/1994 | Nakanishi | H01L 27/14887 257/223 |
| 5,334,868 A | 8/1994 | Wong | |
| 5,430,481 A * | 7/1995 | Hynecek | H01L 27/14887 257/E27.162 |
| 5,440,343 A * | 8/1995 | Parulski et al. | 348/316 |
| 5,602,407 A | 2/1997 | Washkurak et al. | |
| 5,608,243 A | 3/1997 | Chi et al. | |
| 5,625,210 A | 4/1997 | Lee et al. | |
| 5,650,813 A | 7/1997 | Gilblom et al. | |
| 5,652,150 A | 7/1997 | Wadsworth et al. | |
| 5,703,639 A | 12/1997 | Farrier et al. | |
| 5,754,229 A * | 5/1998 | Elabd | 348/319 |
| 5,796,433 A | 8/1998 | Dyck | |
| 5,822,055 A | 10/1998 | Tsai et al. | |
| 5,892,541 A | 4/1999 | Merrill | |
| 5,898,332 A | 4/1999 | Lefevre | |
| 5,907,413 A | 5/1999 | Han | |
| 5,929,471 A | 7/1999 | Weale et al. | |
| 5,960,097 A | 9/1999 | Pfeiffer et al. | |
| 5,978,101 A | 11/1999 | Hofmann et al. | |
| 5,990,503 A | 11/1999 | Ingram et al. | |
| 6,005,617 A | 12/1999 | Shimamoto et al. | |
| 6,018,365 A | 1/2000 | Merrill | |
| 6,133,596 A | 10/2000 | Woolaway et al. | |
| 6,249,341 B1 | 6/2001 | Basiji et al. | |
| 6,278,142 B1 | 8/2001 | Hynecek | |
| 6,307,195 B1 | 10/2001 | Guidash | |
| 6,392,260 B1 | 5/2002 | Farrier et al. | |
| RE37,740 E | 6/2002 | Chadwick et al. | |
| 6,429,897 B2 | 8/2002 | Derndinger et al. | |
| 6,456,318 B1 | 9/2002 | Noguchi | |
| 6,459,077 B1 | 10/2002 | Hynecek | |
| 6,472,653 B1 * | 10/2002 | Levine et al. | 250/208.1 |
| 6,489,992 B2 | 12/2002 | Savoye | |
| 6,512,843 B1 | 1/2003 | Kuwabara | |
| 6,563,539 B1 * | 5/2003 | Lefevre | 348/295 |
| 6,583,865 B2 | 6/2003 | Basiji et al. | |
| 6,621,577 B2 | 9/2003 | Guern | |
| 6,633,058 B1 | 10/2003 | O. et al. | |
| 6,678,048 B1 | 1/2004 | Rienstra et al. | |
| 6,693,671 B1 * | 2/2004 | Stevens et al. | 348/314 |
| 6,700,658 B2 | 3/2004 | Leonard | |
| 6,707,551 B2 | 3/2004 | Ortyn et al. | |
| 6,714,283 B2 | 3/2004 | Laurent et al. | |
| 6,782,334 B1 | 8/2004 | Eller et al. | |
| 6,867,406 B1 | 3/2005 | Fairley et al. | |
| 6,875,973 B2 | 4/2005 | Ortyn et al. | |
| 6,933,975 B2 * | 8/2005 | Wen | 348/312 |
| 6,977,685 B1 | 12/2005 | Acosta-Serafini et al. | |
| 7,046,283 B1 | 5/2006 | Kamasz et al. | |
| 7,076,394 B2 | 7/2006 | Ikeda | |
| 7,084,973 B1 | 8/2006 | Ingram | |
| 7,130,292 B2 | 10/2006 | Turpin et al. | |
| 7,136,159 B2 | 11/2006 | Tsai et al. | |
| 7,139,023 B2 | 11/2006 | Hynecek | |
| 7,285,010 B2 | 10/2007 | Hatakeyama et al. | |
| 7,295,305 B2 | 11/2007 | Yoshida et al. | |
| 7,330,531 B1 | 2/2008 | Karellas | |
| 7,339,961 B2 | 3/2008 | Tokuhisa et al. | |
| 7,358,474 B2 | 4/2008 | Flynn | |
| 7,365,324 B2 | 4/2008 | Noji et al. | |
| 7,379,251 B2 | 5/2008 | Miwa | |
| 7,417,746 B2 | 8/2008 | Lin et al. | |
| 7,474,394 B2 | 1/2009 | Hamamatsu et al. | |
| 7,492,404 B2 | 2/2009 | Stevens et al. | |
| 7,518,645 B2 | 4/2009 | Farrier | |
| 7,528,943 B2 | 5/2009 | Brown et al. | |
| 7,609,309 B2 | 10/2009 | Brown et al. | |
| 7,645,971 B2 | 1/2010 | Gouch | |
| 7,675,561 B2 | 3/2010 | Lepage | |
| 7,791,638 B2 | 9/2010 | McCutchen | |
| 7,796,174 B1 | 9/2010 | Harwit et al. | |
| 7,855,740 B2 | 12/2010 | Hamilton, Jr. et al. | |
| 7,897,942 B1 | 3/2011 | Bareket et al. | |
| 7,907,270 B2 | 3/2011 | Kusunose | |
| 7,907,765 B2 | 3/2011 | Fauver et al. | |
| 7,928,382 B2 | 4/2011 | Hatakeyama et al. | |
| 7,952,633 B2 | 5/2011 | Brown et al. | |
| 7,973,918 B2 | 7/2011 | Tsuchiya et al. | |
| 7,978,894 B2 | 7/2011 | Soenksen | |
| 7,982,188 B2 | 7/2011 | Shinada et al. | |
| 8,013,989 B2 | 9/2011 | Uto et al. | |
| 8,022,349 B2 | 9/2011 | Baiko et al. | |
| 8,039,811 B1 | 10/2011 | Li et al. | |
| 8,119,969 B2 | 2/2012 | Katzir et al. | |
| 8,122,846 B2 | 2/2012 | Stiblert et al. | |
| 8,179,530 B2 | 5/2012 | Levy et al. | |
| 8,218,138 B2 | 7/2012 | Nakano et al. | |
| 8,451,354 B2 | 5/2013 | Cazaux et al. | |
| 8,736,924 B2 * | 5/2014 | Nelson et al. | 358/482 |
| 2001/0012069 A1 | 8/2001 | Derndinger et al. | |
| 2002/0001759 A1 | 1/2002 | Ohashi et al. | |
| 2003/0095251 A1 | 5/2003 | Maeda et al. | |
| 2003/0174234 A1 | 9/2003 | Kondo et al. | |
| 2003/0222987 A1 | 12/2003 | Karazuba | |
| 2004/0047501 A1 | 3/2004 | Kuwabara | |
| 2004/0263829 A1 | 12/2004 | Ikeda | |
| 2005/0002020 A1 | 1/2005 | Inoue et al. | |
| 2005/0040393 A1 * | 2/2005 | Hong | H01L 27/14603 257/40 |
| 2006/0017924 A1 | 1/2006 | Kowarz et al. | |
| 2006/0180834 A1 * | 8/2006 | Holland | H01L 27/1463 257/215 |
| 2007/0070336 A1 | 3/2007 | Maeda et al. | |
| 2007/0096772 A1 | 5/2007 | Flynn | |
| 2008/0017892 A1 * | 1/2008 | Parks | H01L 27/14887 257/223 |
| 2008/0079032 A1 * | 4/2008 | Swain | H01L 27/14683 257/228 |
| 2008/0273196 A1 | 11/2008 | Fairley et al. | |
| 2009/0231689 A1 | 9/2009 | Pittsyn et al. | |
| 2009/0238446 A1 | 9/2009 | Kataoka et al. | |
| 2009/0244530 A1 | 10/2009 | Iida et al. | |
| 2009/0284591 A1 | 11/2009 | Tsuchiya et al. | |
| 2010/0060890 A1 | 3/2010 | Tsuchiya et al. | |
| 2010/0140729 A1 * | 6/2010 | Banghart | H01L 27/14683 257/431 |
| 2010/0188655 A1 | 7/2010 | Brown et al. | |
| 2010/0208978 A1 | 8/2010 | Terasawa et al. | |
| 2010/0245640 A1 * | 9/2010 | Bell et al. | 348/294 |
| 2010/0260409 A1 | 10/2010 | Ben-Levy | |
| 2010/0302427 A1 * | 12/2010 | Wang | H01L 27/14887 348/311 |
| 2011/0017915 A1 | 1/2011 | Curry | |
| 2011/0025888 A1 * | 2/2011 | Nishizawa | H04N 5/335 348/249 |
| 2011/0102658 A1 * | 5/2011 | Wang | H01L 27/14887 348/314 |
| 2011/0141330 A1 | 6/2011 | Vampola | |
| 2011/0181868 A1 | 7/2011 | Stokowski | |
| 2011/0234877 A1 | 9/2011 | Frias et al. | |
| 2011/0298956 A1 | 12/2011 | Giffard et al. | |

(56) References Cited

U.S. PATENT DOCUMENTS

| | | | |
|---|---|---|---|
| 2011/0317052 A1 | 12/2011 | Kieft | |
| 2012/0069176 A1 | 3/2012 | Park et al. | |
| 2012/0168608 A1* | 7/2012 | Matsumoto | ....... H01L 27/14843 250/208.1 |
| 2012/0193683 A1 | 8/2012 | Mayer | |

FOREIGN PATENT DOCUMENTS

| | | | |
|---|---|---|---|
| EP | 0738886 | A2 | 10/1996 |
| EP | 0783227 | A2 | 7/1997 |
| EP | 1081766 | A1 | 3/2001 |
| EP | 1152469 | A2 | 11/2001 |
| EP | 1571741 | A1 | 9/2005 |
| EP | 2023611 | A2 | 2/2009 |
| EP | 2190002 | A1 | 5/2010 |
| JP | 11298805 | A | 10/1999 |
| JP | 2004177644 | A | 6/2004 |
| JP | 2004251764 | A | 9/2004 |
| JP | 2006145989 | A | 6/2006 |
| JP | 2006284183 | A | 10/2006 |
| JP | 2007093317 | A | 4/2007 |
| JP | 2007221167 | A | 8/2007 |
| JP | 2008-236156 | A | 10/2008 |
| JP | 2009042570 | A | 2/2009 |
| JP | 2009092948 | A | 4/2009 |
| JP | 2010199989 | A | 9/2010 |
| JP | 2010245330 | A | 10/2010 |
| JP | 2010258155 | A | 11/2010 |
| JP | 2011048393 | A | 3/2011 |
| JP | 2011146924 | A | 7/2011 |
| JP | 2011259428 | A | 12/2011 |
| KR | 20110137934 | A | 12/2011 |
| WO | WO-0216894 | A1 | 2/2002 |
| WO | WO-0235217 | A2 | 5/2002 |
| WO | WO-02093906 | A1 | 11/2002 |
| WO | WO-2005027037 | A2 | 3/2005 |
| WO | WO-2007016682 | A2 | 2/2007 |
| WO | WO-2007076138 | A2 | 7/2007 |
| WO | WO-2009034564 | A2 | 3/2009 |
| WO | WO-2009123767 | A1 | 10/2009 |
| WO | WO-2009149103 | A1 | 12/2009 |
| WO | WO-2009156981 | A1 | 12/2009 |
| WO | WO-2010083270 | A1 | 7/2010 |
| WO | WO-2010085578 | A2 | 7/2010 |
| WO | WO-2011022573 | A2 | 2/2011 |
| WO | WO-2011055117 | A1 | 5/2011 |
| WO | WO-2011080670 | A1 | 7/2011 |
| WO | WO-2011138374 | A1 | 11/2011 |
| WO | WO-2011144459 | A1 | 11/2011 |

OTHER PUBLICATIONS

Agwani et al., "A High Speed, Dual Output Channel, Stage Selectable, TDI CCD Image Sensor for High Resolution Applications," Proc. SPIE vol. 2415 pp. 124-129 (Apr. 10, 1995).

English language abstract and machine-assisted translation for JP 2008-236156 extracted from the espacenet.com database on Feb. 1, 2014, pages.

Actions on the Merits for copending U.S. Appl. No. 13/625,282, filed Sep. 24, 2012.

Actions on the Merits for copending U.S. Appl. No. 13/625,246, filed Sep. 24, 2014, U.S. Appl. No. 13/625,267, filed Sep. 24, 2013, U.S. Appl. No. 13/625,282, filed Sep. 24, 2012.

* cited by examiner

TIME-DELAY-AND-INTEGRATE IMAGE SENSORS HAVING VARIABLE INTEGRATION TIMES

This application claims the benefit of and priority to U.S. Provisional Patent Application No. 61/540,113, filed Sep. 28, 2011, U.S. Provisional Patent Application No. 61/540,117, filed Sep. 28, 2011, U.S. Provisional Patent Application No. 61/540,120, filed Sep. 28, 2011, and U.S. Provisional Patent Application No. 61/541,189, filed Sep. 30, 2011, the entire disclosure of each of which is hereby incorporated herein by reference.

CROSS REFERENCE TO RELATED, COPENDING APPLICATION

Related subject matter is found in:
1. Copending patent application Ser. No. 13/625,282, entitled "Time-Delay-and-Integrate Image Sensors Having Variable Integration Times," invented by John T. Compton and David N. Nichols, filed on Sep. 24, 2012 and assigned to the assignee hereof, now U.S. Pat. No. 9,049,353, issued Jun. 2, 2015.
2. Copending patent application Ser. No. 13/625,246, entitled "Time-Delay-and-Integrate Image Sensors Having Variable Integration Times," invented by Edward T. Nelson, David N. Nichols, and John T. Compton, filed on Sep. 24, 2012 and assigned to the assignee hereof, now U.S. Pat. No. 8,736,924, issued May 27, 2014.
3. Copending patent application Ser. No. 13/625,267, entitled "Time-Delay-and-Integrate Image Sensors Having Variable Integration Times," invented by Edward T. Nelson and John T. Compton, filed on Sep. 24, 2012 and assigned to the assignee hereof, now U.S. Pat. No. 8,964,088, issued Feb. 24, 2015.

TECHNICAL FIELD

The present invention relates, in various embodiments, to the construction, fabrication, and use of time-delay-and-integrate (TDI) image sensors.

BACKGROUND

Electronic image-capture devices are typically divided broadly into two types: cameras and scanners. Cameras employ electronic image sensors that have a two-dimensional (i.e., areal) array of photosensitive areas (or "photosites") that permit an image of a scene to be captured without requiring relative motion between the scene to be captured, the image sensor, and any optical elements used for forming an optical image of the scene on the image sensor. The photosites typically collect photon-induced electrical charge (or "photocharge") over some time period, and the electrical charge is measured and transformed into the picture elements (pixels) of the captured image. By way of example, the KODAK KAF-8300 is an areal-array image sensor for use in cameras. The KAF-8300 includes a 3326×2504 two-dimensional array of photosites, each of which separately collects photocharge, and which collectively provide 8.3 million pixels in a captured image.

In contrast, scanners typically require relative motion between the scene to be captured and the image sensor, or movement of optical elements used for forming an optical image on the sensor, to sweep the optical image of the scene across the photosensitive areas of the electronic image sensor. Scanners typically employ electronic image sensors that have a one-dimensional (i.e., linear) array of photosensitive areas. Photocharge is allowed to accumulate over some time period in the photosites, and the resulting accumulated charge in each photosite is then measured. This accumulate-and-measure process occurs repetitively during the scanning process, with each iteration forming a single line of pixels in the captured image. In this way, a two-dimensional captured image is formed from successively captured single lines of pixels. In one common scanner variant, multiple linear arrays, each array provided with a color-selective filter, are employed to capture color images. By way of example, the KODAK KLI-4104 is a linear-array image sensor for use in scanners. The KLI-4104 includes four linear arrays: three separate arrays of 4080 10 µm photosites, with each array filtered to capture red, green, or blue light, and a fourth array of 8160 5 µm photosites that are unfiltered to permit capture light over a broad color spectrum.

Scanners are used for capturing images of documents, for capturing images of moving items in an manufacturing plant (for example, canned beverages), for robotic vision (typically employing a polygonal mirror to sweep the scene image across the linear sensor), and for airplane- or satellite-based imaging of the surface of the Earth. In some of these applications the image-capture device may be called a camera, but if the application requires relative motion between the scene and the image sensor (or movement of optical elements to produce an effective motion of the scene across the image sensor) it employs a scanner as the term is used herein.

A time-delay-and-integrate (TDI) sensor is a particular type of electronic image sensor employed in scanners. In contrast to a linear-array sensor, a TDI sensor employs multiple photosites that are used collectively to form each pixel of the captured image. The multiple photosites used for a given pixel are arranged in a column that is aligned with the direction of motion of the optical image across the sensor. In this way, each photosite in the column is presented sequentially with a particular portion of the optical image. The photocharge accumulated in each successive photosite during the time that the portion of the optical image moves over the photosite contributes to the respective pixel in the captured image. In this manner, the TDI sensor increases the photocharge accumulation time for each pixel of the captured image. A typical TDI sensor includes many column-wise photosites arranged in parallel.

A TDI charge-coupled device (CCD) sensor 100 is shown in FIG. 1. The TDI sensor 100 includes multiple integrating CCDs (ICCDs) 102, a readout CCD (RCCD) 104, and a charge-measurement and amplifier circuit 106. (In some descriptions, the ICCDs are called vertical CCDs and the RCCD is called a horizontal CCD.) As an optical image sweeps vertically downward across the ICCDs 102, the charge-shifting mechanism of the ICCDs is employed to move packets of charge downward simultaneously with the movement of the optical image. As a packet of charge moves from the top of an ICCD 102 to the RCCD 104, it travels through multiple photosites and accumulates additional photocharge along the way. When a line of charge packets reaches the RCCD 104, the charge packets are shifted laterally in the RCCD (in the illustrated embodiment) to be individually read out of the sensor 100 by the charge-measurement and amplifier circuit 106. The time required for a charge packet to travel from the top of an ICCD 102 until it enters the RCCD 104 for readout is the exposure time, or integration time, for a given pixel of the captured image. Compared to a conventional linear-array image sensor, a TDI image sensor typically enables significantly increased integration time.

FIG. 2 further illustrates the operation of a TDI image sensor. Light from scene element 202 is collected by optical system 204 in order to produce an optical image 206 on the face of the TDI image sensor. Scene element 202 moves vertically upward with respect to optical system 204 and the TDI image sensor. This causes corresponding optical image 206 to move vertically downward across the surface of the TDI image sensor. Simultaneously with the downward motion of the optical image 206, the ICCDs of the TDI image sensor are clocked downward toward the RCCD of the TDI image sensor. As each line of accumulated packets of photocharge from the ICCDs is clocked vertically into the RCCD and then horizontally out through the TDI image sensor's charge-measurement and amplifier circuit, a line of pixels of the captured image is produced.

If a scene to be captured is sufficiently bright, allowing photocharge to accumulate over the length of the ICCD may cause the accumulated photocharge to exceed the charge capacity of the ICCD for the brightest areas of the scene. To avoid this, one of the horizontal clock lines for the ICCDs may be held in a state to prevent charge packets from above the clock line from continuing below the clock line. For example, horizontal clock line 108 (see FIG. 1) may be used to block charge from the upper $15/16$ of the ICCDs 102, effectively reducing the integration time to $1/16$ of the potential full integration time. In similar fashion, horizontal clock line 110 reduces integration time to $1/8$ of the full integration time, horizontal clock line 112 reduces integration time to $1/4$ of the full integration time, and horizontal clock line 114 reduces integration time to $1/2$ of the full integration time.

By way of example of the type of image sensor shown in FIG. 1, a TDI image sensor is described in "A High Speed, Dual Output Channel, Stage Selectable, TDI CCD Image Sensor for High Resolution Applications" (Agwani, et al, Proc. SPIE, Vol. 2415, Page 124 (1995)). The device described has 2048 ICCDs, each ICCD consisting of 96 CCD integrating stages, and with the number of integrating stages selectable among 96, 48, 24, 12, and 6 stages. The RCCD is split into two CCDs, with one CCD for even-numbered ICCDs and the other for odd-numbered ICCDs, and with separate charge measurement and amplifier circuits associated with each of the two readout CCDs. The sensor provides captured image pixel lines at up to 14,000 lines per second, and provides a dynamic range of 6000:1.

Although TDI CCD image sensors generally have very high sensitivity due to the long integration times provided by the ICCDs and also have flexibility in integration time by selecting the number of stages of integration employed, there remains a need for greater dynamic range. For example, when capturing images of the Earth's surface, a natural body of water or water standing on the roof of a building may reflect sunlight, while nearby scene elements may be dark or in shadow. In such a situation, the range of light level between the reflected sunlight and the dark areas of the scene may far exceed the 6000:1 dynamic range of a typical CCD TDI image sensor such as the one described above.

One proposed technique for increasing dynamic range in a TDI CCD is described in "An Adaptive Sensitivity™ TDI CCD Sensor" (Chen and Ginosar, Proc. SPIE, Vol. 2950, 45 (1996)). In this sensor, each ICCD is composed of 13 TDI stages, a conditional reset circuit, 4 more TDI stages, another conditional reset circuit, and a final TDI stage before reaching the RCCD. The conditional reset circuits include a charge-measurement amplifier that controls a discharge gate: as each charge packet is clocked through the CCD stage associated with the conditional reset circuit, the amount of charge is measured. If the measured charge exceeds a threshold, the discharge gate is operated to remove the charge from the CCD. In this fashion, the dynamic range of the image sensor is increased: dark areas of the scene do not cause either of the conditional reset circuits in an ICCD to trigger, thereby getting the benefit of the full 13+4+1=18 TDI stages; middle brightness areas of the scene cause the first conditional reset circuit to trigger, but not the second, allowing the use of 4+1=5 TDI stages; and the brightest areas of the scene cause both conditional reset circuits to trigger, thereby using only a single TDI stage to capture those areas of the scene. Effectively this increases the dynamic range of the sensor by a factor of 18, i.e., the difference between 18 TDI stages used for dark areas of the scene and 1 TDI stage used for bright areas of the scene.

However, there are several shortcomings with this approach. First, the conditional reset circuit consumes a significant amount of area, as it includes multiple transistors. Second, a contact must be placed in the CCD stage associated with the conditional reset circuit to permit the measurement of charge, and the contact has the potential for producing dark current or otherwise affecting the charge packet as it passes through the affected CCD stage. Additionally, there is no mechanism for determining from the output whether a particular pixel integrated over the full 18 stages, was reset once and integrated over only 4 stages, or was reset twice and integrated over only a single stage. Therefore, there remains a need to increase the dynamic range of a TDI CCD image sensor while addressing these shortcomings.

SUMMARY

Embodiments of the present invention increase the dynamic range of TDI CCD image sensors by selectively controlling the projection of light onto the image sensor and/or selectively resetting one or more stages of one of more of the ICCDs of the image sensor while and/or prior to a scene being imaged by the TDI image sensor. In preferred embodiments the stages are substantially identical to each other and are all independently resettable, in contrast to more complex conventional designs utilizing only a few specialized resettable stages. The dynamic-range control of the image sensor may be based on previously captured images, which may be captured either by the image sensor itself or another image sensor (termed a "leading sensor") that is configured to capture light from a scene immediately prior to the scene being imaged by the TDI image sensor. (This prior-captured light may be termed a "leading image," which as used herein refers to at least a portion of a scene to be imaged by the TDI image sensor and which may be at a different resolution than the scene as later captured by the TDI image sensor.) For example, bright areas may be identified prior to imaging, and stages of the image sensor corresponding to such areas may be selectively reset to prevent "charge blooming" into neighboring ICCDs during image capture. Alternatively or in combination, the amount of light from the scene reaching stages of the image sensor corresponding to the bright areas may be decreased via use of, e.g., an optical mask, thereby substantially preventing the generation of excessive photocharge in those stages. Each of the ICCDs may incorporate a sense node for measurement of charge within the ICCD channel and/or selective reset of stages of the ICCDs via direction of photocharge into the sense node. Alternatively or in combination, all of the ICCD stages may be configured for individual reset via application of a bias to the stage control line (each of which preferably controls a particular stage common across all of the ICCDs) and to a gate associated with each ICCD. As used herein, a "scene" does not connote any particular content, and may be, e.g., a pictorial scene, a graphical scene (e.g., a document or other text), a medical image, etc.

In an aspect, embodiments of the invention feature an imaging system that includes a time-delay-and-integrate (TDI) image sensor including or consisting essentially of (i) a plurality of integrating CCDs (ICCDs), arranged in parallel, that accumulate photocharge in response to exposure to light, (ii) electrically coupled to the plurality of ICCDs, a readout CCD (RCCD) for receiving photocharge from the plurality of ICCDs, and (iii) electrically coupled to the RCCD, readout circuitry for converting charge received from the RCCD into voltage. An optical system receives light from a scene to be imaged and projects it on the plurality of ICCDs. A leading sensor receives the light projected from the optical system prior to projection thereof on the plurality of ICCDs, thereby capturing a leading image of the scene. A control system controls operation of the TDI image sensor based at least in part on at least a portion of the leading image.

Embodiments of the invention may feature one or more of the following in any of a variety of combinations. The optical system may be configured to sweep the light from the scene across the leading sensor and the TDI image sensor continuously and sequentially. The leading sensor may be configured to collect color information related to the scene. The TDI image sensor may not be configured to collect color information related to the scene or may be configured to collect monochrome intensity levels (e.g., only monochrome intensity levels) related to the scene. The leading sensor and the TDI image sensor may be disposed on a substrate. The dynamic range of the leading sensor may be less than the dynamic range of the TDI image sensor. The control system may alter the integration time of at least one of the ICCDs based on the brightness level of at least a portion of the leading image. The TDI image sensor may include an optical mask disposed between the optical system and the plurality of ICCDs. The optical mask may include or consist essentially of an array of masking elements, and the control system may control the masking elements to mask portions of the ICCDs whereby light collection at such portions is attenuated. The optical mask may include or consist essentially of an array of reflective elements, and the control system may control the reflective elements to selectively reflect portions of the light from the optical system onto the plurality of ICCDs.

Each ICCD may include or consist essentially of (i) a plurality of independently controllable stages, (ii) a photosensitive channel for containing photocharge, (iii) a drain for removing photocharge from the channel, and (iv) a gate for controlling flow of photocharge from the channel to the drain. A plurality of clock lines may be disposed substantially perpendicular to the ICCDs. Each clock line may control a particular stage common to all of the ICCDs. The control system may be configured to reset a selected stage of a selected ICCD by (i) applying a bias to the clock line corresponding to the selected stage and (ii) applying a bias to the gate corresponding to the selected ICCD.

Each ICCD may include or consist essentially of (i) a plurality of independently controllable stages, (ii) a photosensitive channel for containing photocharge, (iii) a sense node for measuring photocharge received thereby from the channel, and (iv) a gate for controlling flow of photocharge from the channel to the sense node. The control system may be configured to (i) measure photocharge received by the sense node from the channel and (ii) reset the sense node by applying a bias thereto to remove photocharge therefrom. The control system may be configured to reset a selected stage of the ICCD by applying a bias to the gate to thereby allow photocharge to flow from the channel into the sense node.

In another aspect, embodiments of the invention feature a method of image capture utilizing a time-delay-and-integrate (TDI) image sensor that includes or consists essentially of (i) a plurality of integrating CCDs (ICCDs), arranged in parallel, that accumulate photocharge in response to exposure to light, (ii) electrically coupled to the plurality of ICCDs, a readout CCD (RCCD) for receiving photocharge from the plurality of ICCDs, and (iii) electrically coupled to the RCCD, readout circuitry for converting charge received from the RCCD into voltage. Light received from a scene to be imaged is projected onto a leading sensor, the leading sensor capturing a leading image of the scene. Thereafter, light from the scene is projected onto the plurality of ICCDs to capture a scene image. During capture of the scene image, operation of the TDI sensor is controlled based at least in part on at least a portion of the leading image.

Embodiments of the invention may feature one or more of the following in any of a variety of combinations. The projection of light onto the leading sensor and onto the plurality of ICCDs may be performed continuously and sequentially. The leading image may include color information. The scene image may be substantially free of color information. Controlling operation of the TDI sensor may include or consist essentially of altering an integration time of at least one of the ICCDs based on the brightness level of at least a portion of the leading image. Controlling operation of the TDI sensor may include or consist essentially of masking portions of the ICCDs whereby light collection at such portions is attenuated. Controlling operation of the TDI sensor may include or consist essentially of resetting a selected stage of a selected ICCD. Resetting the selected stage may include or consist essentially of transferring photocharge therewithin into a drain associated with the selected ICCD. Resetting the selected stage may include or consist essentially of transferring photocharge therewithin into a sense node associated with the selected ICCD. The leading image may be compared with the scene image to detect motion in the scene.

In yet another aspect, embodiments of the invention feature an imaging system including or consisting essentially of a time-delay-and-integrate (TDI) image sensor, an optical system for receiving light from a scene to be imaged, and an optical mask. The TDI image sensor includes or consists essentially of (i) a plurality of integrating CCDs (ICCDs), arranged in parallel, that accumulate photocharge in response to exposure to light, (ii) electrically coupled to the plurality of ICCDs, a readout CCD (RCCD) for receiving photocharge from the plurality of ICCDs, and (iii) electrically coupled to the RCCD, readout circuitry for converting charge received from the RCCD into voltage. The optical system projects light from the scene to be imaged on the plurality of ICCDs. The optical mask is disposed between the optical system and the plurality of ICCDs and selectively alters the intensity of light projected to at least portions of the ICCDs.

Embodiments of the invention may feature one or more of the following in any of a variety of combinations. The optical mask may include or consist essentially of an array of independently controllable masking elements each for attenuating light collection by a different portion of the ICCDs. The optical mask may include or consist essentially of an array of independently controllable reflective elements each for selectively reflecting a portion of the light from the optical system onto the ICCDs. A control system may control the optical mask based at least in part on light from the scene to be imaged before such light is projected by the optical system.

In a further aspect, embodiments of the invention feature a method of image capture utilizing a time-delay-and-integrate (TDI) image sensor comprising (i) a plurality of integrating CCDs (ICCDs), arranged in parallel, that accumulate photocharge in response to exposure to light, (ii) electrically coupled to the plurality of ICCDs, a readout CCD (RCCD) for receiving photocharge from the plurality of ICCDs, and (iii) electrically coupled to the RCCD, readout circuitry for converting charge received from the RCCD into voltage. Light received from a scene to be imaged is projected onto the plurality of ICCDs to capture an image of the scene. During capture of the image, the intensity of light projected to at least portions of the ICCDs is selectively altered.

Embodiments of the invention may feature one or more of the following in any of a variety of combinations. The intensity of light projected to at least portions of the ICCDs may be altered with an optical mask disposed between the scene and the ICCDs. The optical mask may include or consist essentially of an array of masking elements each independently controllable to mask a portion of the ICCDs whereby light collection in the masked portion is attenuated. The optical mask may include or consist essentially of an array of reflective elements each independently controllable to reflect a portion of the projected light onto the ICCDs. The selective alteration of the intensity of light projected to at least portions of the ICCDs during capture of the image may be based at least in part on a previously captured image.

In another aspect, embodiments of the invention feature an imaging system including or consisting essentially of a time-delay-and-integrate (TDI) image sensor and an optical system for receiving light from a scene to be imaged. The TDI image sensor includes or consists essentially of (i) a plurality of integrating CCDs (ICCDs), arranged in parallel, that accumulate photocharge in response to exposure to light, (ii) electrically coupled to the plurality of ICCDs, a readout CCD (RCCD) for receiving photocharge from the plurality of ICCDs, and (iii) electrically coupled to the RCCD, readout circuitry for converting charge received from the RCCD into voltage. The optical system projects light from the scene to be imaged on the plurality of ICCDs. Each ICCD includes or consists essentially of (i) a plurality of independently controllable stages, (ii) a photosensitive channel for containing photocharge, (iii) a drain for removing photocharge from the channel, and (iv) a gate for controlling flow of photocharge from the channel to the drain.

Embodiments of the invention may feature one or more of the following in any of a variety of combinations. A plurality of clock lines may be disposed substantially perpendicular to the ICCDs. Each clock line may control a particular stage common to all of the ICCDs. A control system may be configured to reset a selected stage of a selected ICCD by (i) applying a bias to the clock line corresponding to the selected stage and (ii) applying a bias to the gate corresponding to the selected ICCD. The control system may be configured to reset the selected stage based at least in part on a previously captured image (i.e., an image captured by the imaging system prior to the light from the scene to be imaged being projected by the optical system).

In yet another aspect, embodiments of the invention feature a method of image capture utilizing a time-delay-and-integrate (TDI) image sensor comprising (i) a plurality of integrating CCDs (ICCDs), arranged in parallel and each comprising a plurality of stages, that accumulate photocharge in response to exposure to light, (ii) electrically coupled to the plurality of ICCDs, a readout CCD (RCCD) for receiving photocharge from the plurality of ICCDs, and (iii) electrically coupled to the RCCD, readout circuitry for converting charge received from the RCCD into voltage. Each stage of each ICCD is independently resettable. Light received from a scene to be imaged is projected onto the plurality of ICCDs to capture an image of the scene. During capture of the image, a selected stage of a selected ICCD is reset to remove photocharge from the selected stage. Resetting the selected stage may include or consist essentially of transferring photocharge therewithin into a drain associated with the selected ICCD.

In an additional aspect, embodiments of the invention feature an imaging system including or consisting essentially of a time-delay-and-integrate (TDI) image sensor and an optical system for receiving light from a scene to be imaged. The TDI image sensor includes or consists essentially of (i) a plurality of integrating CCDs (ICCDs), arranged in parallel, that accumulate photocharge in response to exposure to light, (ii) electrically coupled to the plurality of ICCDs, a readout CCD (RCCD) for receiving photocharge from the plurality of ICCDs, and (iii) electrically coupled to the RCCD, readout circuitry for converting charge received from the RCCD into voltage. The optical system projects light from the scene to be imaged on the plurality of ICCDs. Each ICCD includes or consists essentially of (i) a plurality of independently controllable stages, (ii) a photosensitive channel for containing photocharge, (iii) a sense node for measuring photocharge received thereby from the channel, and (iv) a gate for controlling flow of photocharge from the channel to the sense node.

Embodiments of the invention may feature one or more of the following in any of a variety of combinations. A plurality of clock lines may be disposed substantially perpendicular to the ICCDs. Each clock line may control a particular stage common to all of the ICCDs. A control system may be configured to (i) measure photocharge received by the sense node from the channel and (ii) reset the sense node by applying a bias thereto to remove photocharge therefrom. A control system may be configured to reset a selected stage of the ICCD by applying a bias to the gate to thereby allow photocharge to flow from the channel into the sense node. The control system may be configured to reset the selected stage based at least in part on a previously captured image (i.e., an image captured by the imaging system prior to the light from the scene to be imaged being projected by the optical system).

In yet an additional aspect, embodiments of the invention feature a method of image capture utilizing a time-delay-and-integrate (TDI) image sensor comprising (i) a plurality of integrating CCDs (ICCDs), arranged in parallel, that accumulate photocharge in response to exposure to light, (ii) electrically coupled to the plurality of ICCDs, a readout CCD (RCCD) for receiving photocharge from the plurality of ICCDs, and (iii) electrically coupled to the RCCD, readout circuitry for converting charge received from the RCCD into voltage. Each ICCD includes or consists essentially of (i) a plurality of independently controllable stages, (ii) a photosensitive channel for containing photocharge, (iii) a sense node for measuring photocharge received thereby from the channel, and (iv) a gate for controlling flow of photocharge from the channel to the sense node. Light received from a scene to be imaged is projected onto the plurality of ICCDs. During light projection, (i) photocharge received by the sense node from the channel is measured and (ii) the sense node is reset by applying a bias thereto to remove photocharge therefrom, and/or during light projection, a selected stage of the ICCD is reset by applying a bias to the gate to thereby allow photocharge to flow from the channel into the sense node.

These and other objects, along with advantages and features of the present invention herein disclosed, will become more apparent through reference to the following description, the accompanying drawings, and the claims. Furthermore, it is to be understood that the features of the various embodiments described herein are not mutually exclusive and may exist in various combinations and permutations. As used herein, the terms "approximately" and "substantially" mean ±10%, and in some embodiments, ±5%. The term "consists essentially of" means excluding other materials that contribute to function, unless otherwise defined herein.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention. In the following description, various embodiments of the present invention are described with reference to the following drawings, in which.

DETAILED DESCRIPTION

Figure 3A:
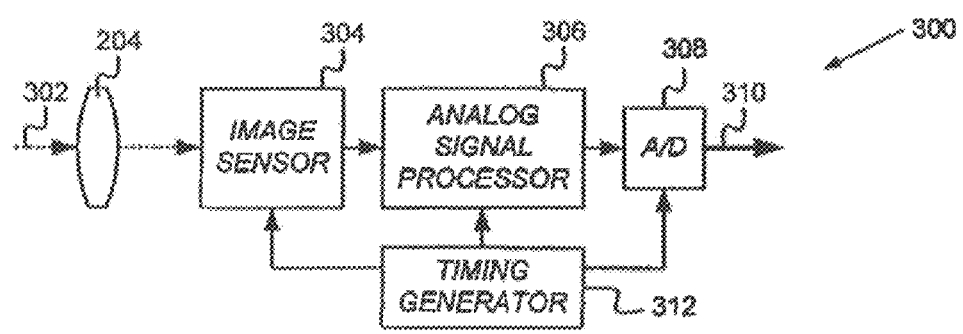
FIG. 3A is a block diagram of an image-capture device utilizing an image sensor in accordance with various embodiments of the invention.

FIG. 3A is a block diagram of an exemplary image-capture device 300 that includes an electronic image sensor 304 in accordance with various embodiments of the invention. In FIG. 3A, incoming light 302 from a scene to be captured is focused on image sensor 304 by optical system 204. Image sensor 304 provides an analog electronic signal that is representative of the optical image focused on the image sensor. This analog signal is processed by an analog signal processor 306. The analog signal processor 306 typically performs one or more of the functions of signal sampling, reference/signal correlation, gain, black-level adjustment, and other analog processing. The output of the analog signal processor 306 is converted to digital output 310 by analog-to-digital (A/D) converter 308. A timing generator synchronizes the operation of the image sensor 304, the analog signal processor 306, and the A/D converter 308. Two or more elements of image-capture device 300 may be combined into a single device: for example, the analog signal processor 304, the A/D converter 308, and the timing generator 312 may be combined into a single integrated circuit. Conversely, an element of image-capture device 300 may be composed of multiple devices: for example, the timing generator 312 may be composed of an integrated circuit that provides logic-level timing signals and other integrated circuits and/or support circuitry that convert some of the logic-level timing signals into signals appropriate for driving the image sensor. The image sensor 304 may be an areal-array sensor, a linear-array sensor, a TDI sensor, or other electronic image sensor. The image sensor 304 typically employs CCD technology, active pixel sensor (i.e., CMOS image sensor) technology, or other image-sensor technology.

Figure 1:
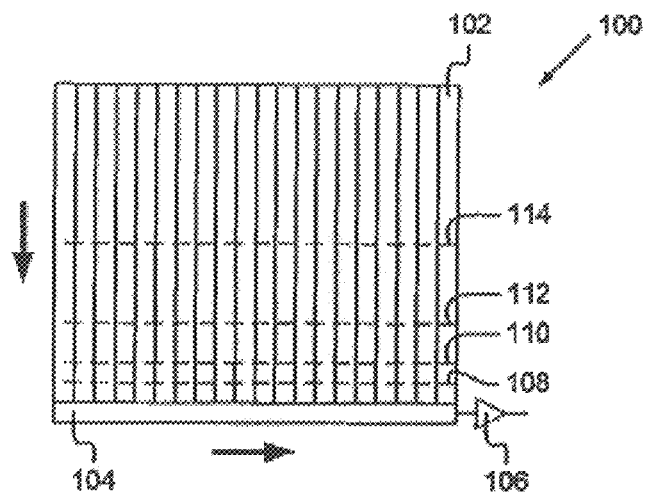
FIG. 1 illustrates a conventional TDI CCD image sensor.
Figure 2:
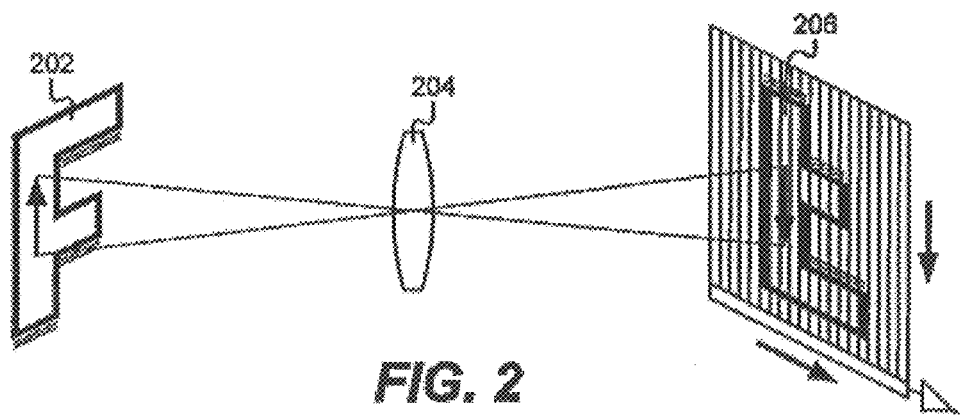
FIG. 2 illustrates an exemplary operation mode of a TDI CCD image sensor.

Referring back to FIG. 1, the TDI CCD image sensor 100 includes multiple ICCDs 102, RCCD 104, and charge-measurement and amplifier circuit 106. In general, embodiments of the present invention employ similar structures. However, various embodiments of the present invention provide improvements to the structure and operation of the ICCDs 102.

The ICCD 102 is considered to be a charge-coupled device because it enables packets of charge to be maintained separately from each other and also enables the packets of charge to be shifted along the length of the ICCD. The ICCD 102 is also considered to be an integrating device because photon-induced charge (photocharge) increases the amount of charge in a charge packet during the period of time the charge packet remains in the ICCD. By collecting photocharge into packets of charge during the time the packets are shifted along its length, the ICCD 102 permits significantly increased integration time and consequently significantly increased sensitivity.

Figure 3B:
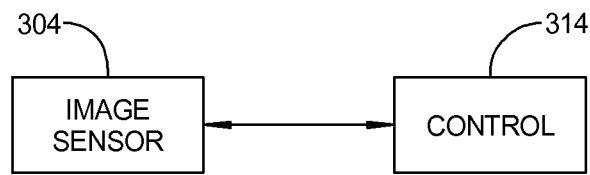
FIG. 3B is a block diagram of portions of an image sensor in accordance with various embodiments of the invention.

FIG. 3B schematically depicts image sensor 304 linked to a controller (or "control system") 314 that controls various operations of image sensor 304, including image capture and read out (and other functionality described below), as well as various operations of other components of image-capture systems described herein. The controller 314 (which in various embodiments of the invention includes or performs the functionalities of the analog signal processor 306, the A/D converter 308, and the timing generator 312) may be a general-purpose microprocessor, but depending on implementation may alternatively be a microcontroller, peripheral integrated circuit element, a customer-specific integrated circuit (CSIC), an application-specific integrated circuit (ASIC), a logic circuit, a digital signal processor, a programmable logic device such as a field-programmable gate array (FPGA), a programmable logic device (PLD), a programmable logic array (PLA), an RFID processor, smart chip, or any other device or arrangement of devices that is capable of implementing the steps of the processes of the invention (such as those described in detail below). The controller 314 may be monolithically integrated with, and thus a portion of the same integrated-circuit chip as, image sensor 304, or controller 314 may be disposed on a chip separate and discrete from the chip containing image sensor 304 (and interconnected thereto by wired or wireless means). Moreover, at least some of the functions of controller 314 may be implemented in software and/or as mixed hardware-software modules. Software programs implementing the functionality herein described may be written in any of a number of high level languages such as FORTRAN, PASCAL, JAVA, C, C++, C#, BASIC, various scripting languages, and/or HTML. Additionally, the software may be implemented in an assembly language directed to a microprocessor resident in controller 314. The software may be embodied on an article of manufacture including, but not limited to, a floppy disk, a jump drive, a hard disk, an optical disk, a magnetic tape, a PROM, an EPROM, EEPROM, field-programmable gate array, CDROM, or DVDROM. Embodiments using hardware-software modules may be implemented using, for example, one or more FPGA, CPLD, or ASIC processors.

Figure 4:
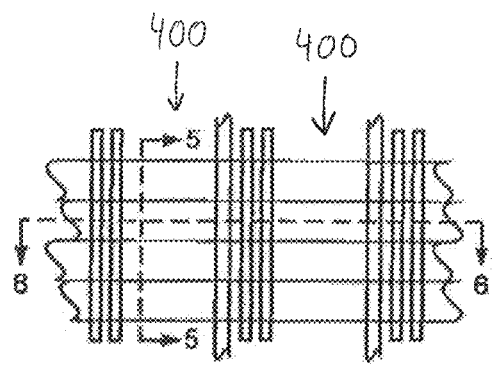
FIG. 4 is a schematic plan view of portions of two ICCDs of a TDI CCD in accordance with various embodiments of the invention.
Figure 5:
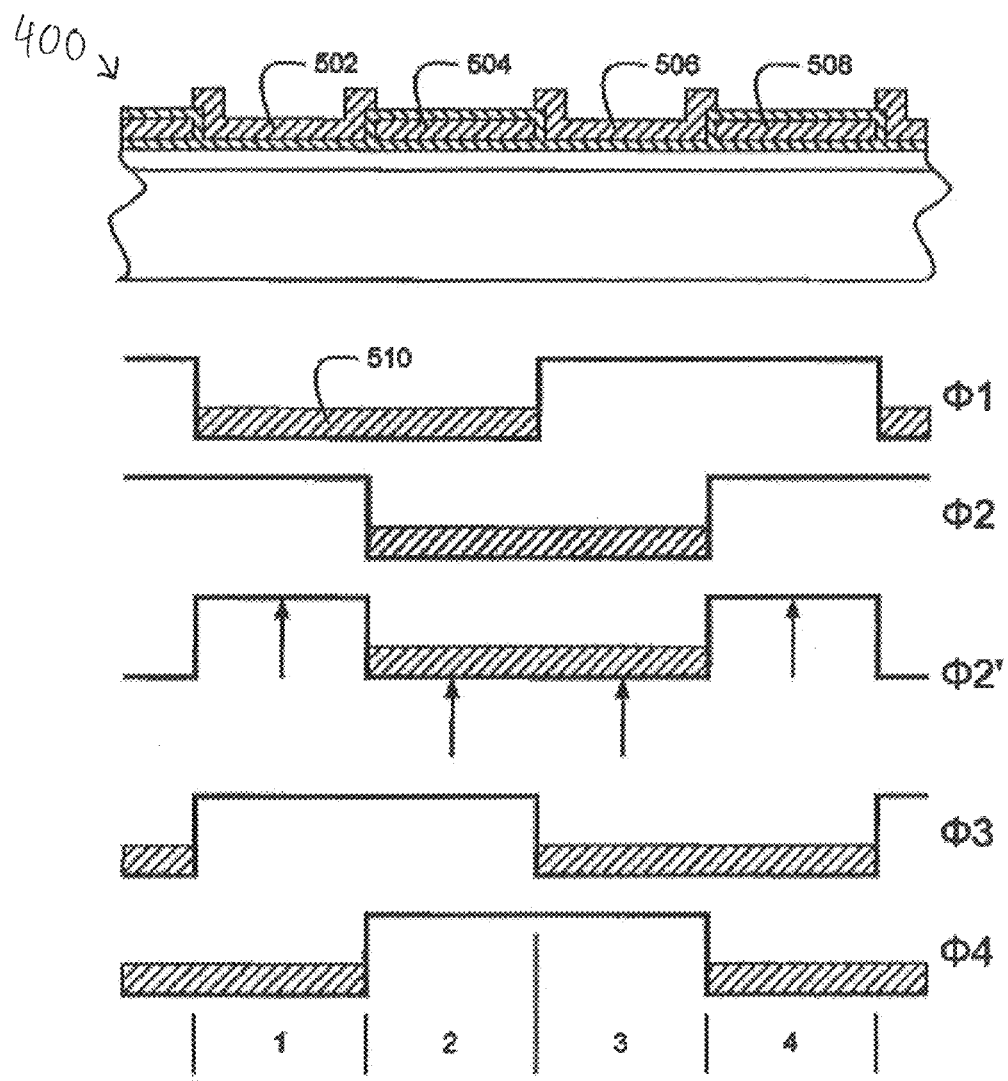
FIG. 5 is a schematic cross-section of a vertical portion of the ICCDs of FIG. 4 showing ICCD clock lines and associated potential diagrams in accordance with various embodiments of the invention.
Figure 6:
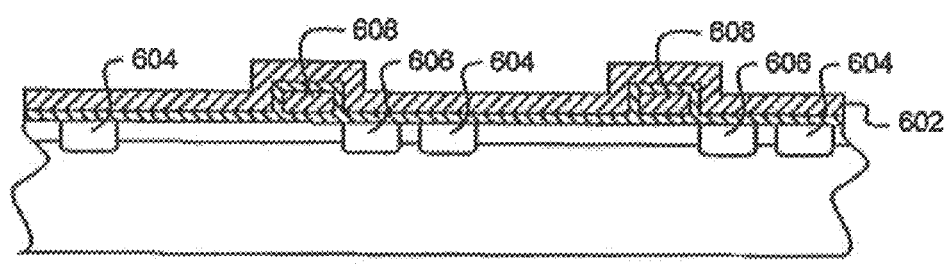
FIG. 6 is a schematic cross-section of a horizontal portion of the ICCDs of FIG. 4 showing two ICCD integrating channels with associated structures in accordance with various embodiments of the invention.

A plan view of portions of two adjacent ICCDs 400 of a TDI CCD in an embodiment of the present invention is shown in FIG. 4. FIG. 5 includes a cross-section of a vertical portion of one of the ICCDs 400, as shown by the cut line 5-5 in FIG. 4. FIG. 6 is a cross-section that cuts horizontally through both of the ICCDs 400, as shown by cut line 6-6 in FIG. 4.

The schematic cross-section at the top of FIG. 5 depicts one stage of an ICCD 400 in accordance with an embodiment of the present invention. Four ICCD clock lines are shown: ICCD clock line 1 (502), ICCD clock line 2 (504), ICCD clock line 3 (506), and ICCD clock line 4 (508). Voltages are applied sequentially to these ICCD clock lines in order to produce potential gradients in the underlying semiconductor, during which packets of charge are kept separate and are moved along the length of the ICCD 400. The four clock lines 502, 504, 506, 508 are operated in four phases to hold and move charge in a manner well understood by those skilled in the art of CCD design and operation. In FIG. 5 the potential diagrams $\Phi 1$, $\Phi 2$, $\Phi 3$, and $\Phi 4$ illustrate the potentials developed under each of the four ICCD clock lines for each of the four phases used in normal operation of ICCD 400. In potential diagram $\Phi 1$, a charge packet 510 is held under ICCD clock line 1 (502) and ICCD clock line 2 (504), and the charge packet is separated from other charge packets by ICCD clock line 3 (506) and ICCD clock line 4 (508). This arrangement of ICCD clock lines and potentials is repeated over the length of the ICCD 400 so that, for example, the ICCD clock line immediately to the left of ICCD clock line 1 is electrically connected to and driven to the same voltage as ICCD clock line 4, thereby acting to contain the charge packet 510 on its left side. (Note that the charge packet 510 in a typical CCD is composed of electrons, so a more positive voltage potential produces an area for electrons to collect. The potential diagrams of FIG. 5 and other figures are drawn to show electron charge being collected in low areas in order to facilitate an understanding of the CCD operation by analogy to fluids.) Thus, in potential diagram $\Phi 1$, ICCD clock lines 1 (502) and 2 (504) produce a storage region for holding a charge packet, and ICCD clock lines 3 (506) and 4 (508) produce a barrier region for separating charge packets. In potential diagram $\Phi 2$, the charge packet is moved to the right (or vertically downward with respect to FIG. 4) by changing the voltages on ICCD clock lines 1 (502) and 3 (506). Similarly, potential diagrams $\Phi 3$ and $\Phi 4$ move the charge packet two more clock lines to the right. By then returning to the potential diagram $\Phi 1$, a new charge packet is held in the storage region produced by ICCD clock lines 1 (502) and 2 (504). Herein, potential diagrams $\Phi 1$ through $\Phi 4$ are referred to alternatively as phase $\Phi 1$ through $\Phi 4$.

The four ICCD clock lines 502, 504, 506, 508 together constitute one stage of an ICCD 400. The arrangement in FIG. 5 is repeated to produce a complete ICCD 400 that has, for example, 32, 48, 64, or 96 stages. As a charge packet is clocked along the ICCD 400 in the manner described above, photocharge is collected in the storage regions at a rate that depends on the amount of light incident on the sensor due to the moving optical image formed on the sensor. A charge packet moving along the ICCD 400 and accumulating photocharge along the way is an "integrating pixel;" when an integrating pixel is read out from the ICCD 400 it becomes a pixel of the capture image.

FIG. 5 includes a potential diagram Φ2' that is an alternative to potential diagram Φ2. In potential diagram Φ2', the voltages applied to the ICCD clock lines 502, 504, 506, 508 are adjusted to shift the barrier and storage regions of the corresponding ICCD stage with respect to adjacent stages. This shifting is shown by the arrows in potential diagram Φ2'. In an embodiment of the invention, the shifting occurs in common for the corresponding stage in all the ICCDs 400 of the TDI image sensor: in reference to FIG. 1, this defines a horizontal row of ICCD stages, one stage from each ICCD 102 in FIG. 1. By shifting the potential for a row of ICCD stages in this way, the corresponding row of integrating pixels is selected for possible reset as described below. This shifting of the potential of a row of ICCD stages is referred to herein as "selecting" a row of ICCD stages or defining a "selected row."

The cross-section in FIG. 6 cuts along one ICCD clock line 602 and across two ICCDs 400 constructed in accordance with an embodiment of the invention. Specifically, the cross-section in FIG. 6 cuts along ICCD clock line 2 (504 in FIG. 5). Channel stop implants 604 in FIG. 6 produce potential barriers to separate each ICCD 400 from adjacent ICCDs 400. Drain implants 606 produce potential regions that permit removal of charge from the adjacent ICCD 400. Gates 608 produce potential regions that provide a barrier between an ICCD 400 and its corresponding drain implant 606; the gates 608 are individually externally controllable to eliminate the barrier between an ICCD 400 and its corresponding drain implant 606, thereby allowing charge to flow from the ICCD 400 into the drain implant 606 under certain conditions.

Figure 7:
FIG. 7 is a potential diagram for an unselected row of the ICCD stages of FIG. 6 in accordance with various embodiments of the invention.

FIG. 7 is a potential diagram associated with FIG. 6 for an unselected row of an ICCD in accordance with an embodiment of the invention. In FIG. 7, the ICCD clock lines are driven to produce the potentials associated with potential diagram Φ2 in FIG. 5. As shown, the gate 608 associated with the left ICCD (left 608 in FIG. 6) remains in a state that produces a barrier between the left ICCD and its corresponding drain 606 (left 606 in FIG. 6), thereby preventing the charge packet 702 within the integrating pixel thus defined from flowing into the drain 606. The gate 608 associated with the right ICCD (right 608 in FIG. 6) is driven so that the barrier between the right ICCD and its corresponding drain 606 (right 606 in FIG. 6) is reduced; however, the barrier is still sufficient to prevent the charge packet 704 within that integrating pixel from flowing into the drain 606. Thus, the potential diagram Φ2 in FIG. 5 prevents an integrating pixel from being reset (the charge packet being drained away) regardless of the states of the gates associated with the ICCDs. Hence, potential diagram Φ2 in FIG. 5 represents an unselected row of ICCD stages that may prevent integrating pixels from being reset regardless of whether an ICCD is selected (e.g., the right ICCD in FIG. 7) or unselected (e.g., the left ICCD in FIG. 7).

Figure 8:
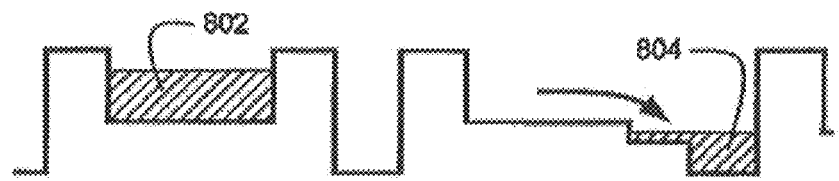
FIG. 8 is a potential diagram for a selected row of the ICCD stages of FIG. 6 in accordance with various embodiments of the invention.

FIG. 8 is a potential diagram associated with FIG. 6 for a selected ICCD row in accordance with an embodiment of the invention. In FIG. 8, the ICCD clock lines are thus driven to produce the potentials associated with potential diagram Φ2' in FIG. 5. In FIG. 8, even though the potential of the storage region has been shifted, the barrier produced by the gate 608 associated with the left ICCD (left 608 in FIG. 6) is sufficient to prevent the charge packet 802 from flowing into the drain 606. The charge packet 802 is effectively held by a storage region defined by the potentials associated with ICCD clock lines 1 and 4 (502 and 508 in FIG. 5), the gate 608 associated with the left ICCD (left 608 in FIG. 6), and the channel stop implant 604 associated with the left ICCD (leftmost 604 in FIG. 6). However, since the potential of the storage region has been shifted, the reduced barrier produced by the gate 608 associated with the right ICCD (right 608 in FIG. 6) is now lower than the floor of the storage region in the right ICCD, thereby allowing the charge packet 804 to flow into the corresponding drain 606. Thus, as shown, the concurrent selection of a row of ICCD stages along with a selected ICCD will cause the integrating pixel from the corresponding storage region to be reset (i.e., the charge packet confined therein to flow to the drain). This effectively reduces the available integration time for the integrating pixel, after being reset, to be the time spent in the remaining ICCD stages between where the integrating pixel reset occurred and the end of the ICCD.

In the embodiment described above, any integrating pixel may be reset at any point as it is clocked along its corresponding ICCD by selection of the appropriate ICCD clock lines (thereby selecting a row of ICCD stages) and ICCD gate (thereby selecting a particular ICCD). The selective reset of integrating pixels provided by this arrangement enables integrating pixels associated with bright regions of the scene to be reset at a point close to the end of the ICCD, thereby permitting them to have a short effective integration time. In a similar fashion, integrating pixels associated with middle ranges of scene brightness are enabled to be reset in the middle of the ICCD, permitting them to have a medium length effective integration time. Integrating pixels associated with dark areas of the scene may not be reset at all, permitting them to have the maximum integration time enabled by all stages of the ICCD. This has the effect of significantly increasing the dynamic range of the TDI image sensor in accordance with embodiments of the present invention.

The embodiments of the invention described above provide the advantage of increased dynamic range without the shortcomings of earlier approaches. For example, compared to conventional charge-measurement circuitry, the drain and gate structures associated with each ICCD are compact structures. All of the ICCD stages are typically identical in the disclosed embodiment, and thus no specialized stages incorporating charge-measurement and discharge circuitry are required. Embodiments of the present invention also do not require a contact to be placed in the ICCD for charge measurement, thereby eliminating a potential source of dark current or other undesirable effects. Finally, since the ICCD clock lines and, in particular, the ICCD gates are externally controllable, the controller that controls these elements and thereby causes the reset of integrating pixels has knowledge of which integrating pixels were reset and at which ICCD stage they were reset. Consequently, in contrast to the output pixels produced by conventional sensors, there is no ambiguity regarding the output pixels: since the reset conditions for a particular integrating pixel are known, the integration time for the corresponding output pixel is also known.

"Externally controllable," as used in the foregoing discussion, means that the determination regarding which integrating pixels to reset and at which ICCD stage to reset them occurs separately from the ICCDs and in such a way that the knowledge of which integrating pixels were reset and at which stage they were reset is available for subsequent image-processing purposes. Externally controllable is not necessarily equivalent to "directly controlled," as there may be intervening circuitry such as decoders, control registers, shift registers, or the like between the controller that resets the integrating pixel and the ICCD clock lines and gates. Externally controllable means external to the array of ICCDs and does not imply that control elements must be on a separate integrated circuit substrate; all or a portion of the elements of the external control may be integrated into the same integrated circuit substrate as the ICCDs, they may be incorporated into an integrated circuit substrate that has been bonded to the TDI sensor, or they may be separate.

Although the embodiment described above enables any integrating pixel to be reset at any stage in the ICCD, such flexibility is not necessarily required. For example, for an ICCD having n stages, providing selective reset of integrating pixels at the (n−1) stage, the (n−2) stage, the (n−4) stage, and the (n−8) stage in an ICCD wherein n=16 permits integrating pixels reset at those stages to have, respectively, one stage of integration, two stages of integration, four stages of integration, or eight stages of integration. Integrating pixels that are not reset at any of the sixteen stages have sixteen stages of integration. In this example, the selective reset of integrating pixels increases the dynamic range of the image sensor by a factor of 16. This arrangement has the additional benefit of restricting to four stages the different clocking utilized to select a row of ICCD stages for possible integrating-pixel reset. This is discussed in more detail below.

Figure 9:
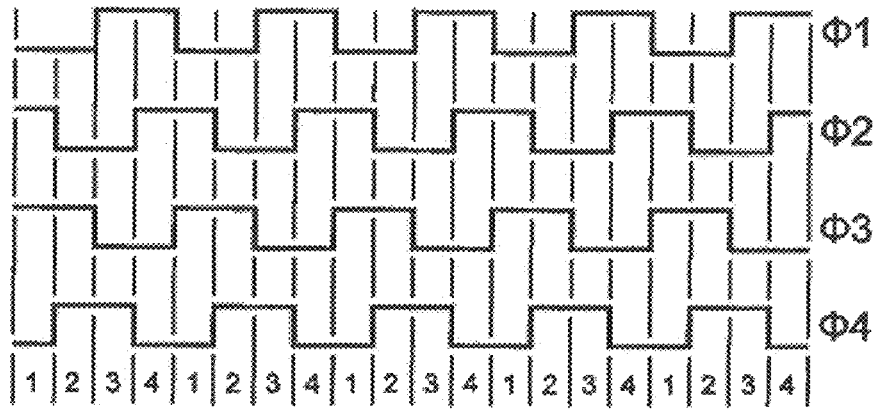
FIG. 9 expands the potential diagrams of FIG. 5 to depict four-phase clocking for multiple ICCD stages in accordance with various embodiments of the invention.

FIG. 9 expands the potential diagrams from FIG. 5 to depict four-phase clocking for five ICCD stages. As shown in FIG. 9, operating the ICCD clock lines to produce the potentials shown in potential diagrams $\Phi 1$ through $\Phi 4$ (and back again to potential diagram $\Phi 1$) moves a charge packet exactly one stage to the right. Each cycle through potential diagrams $\Phi 1$ through $\Phi 4$ in FIG. 9 moves charge packets one stage to the right. For convenience, the ICCD potential profiles related to the potential diagrams $\Phi 1$ through $\Phi 4$ in FIG. 9 and subsequent figures are also referred to as phases $\Phi 1$ through $\Phi 4$.

Figure 10:
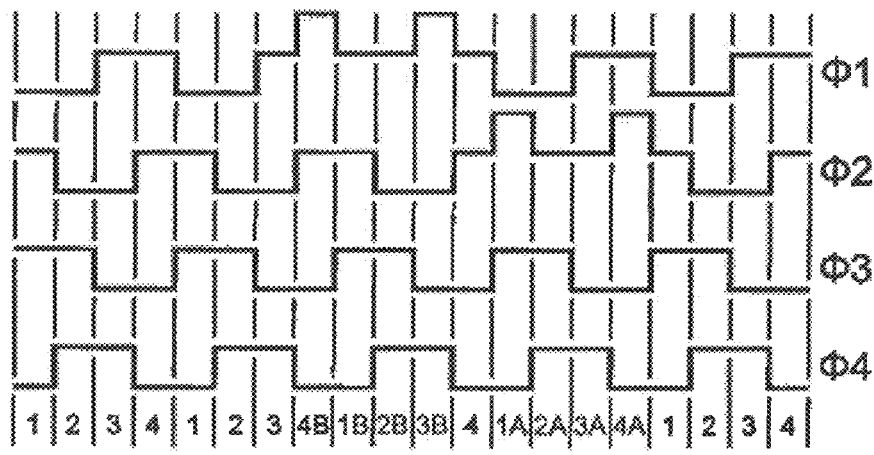
FIG. 10 expands the potential diagrams of FIG. 5 to depict four-phase clocking for multiple ICCD stages including two different rows selected for reset in accordance with various embodiments of the invention.
Figure 11:
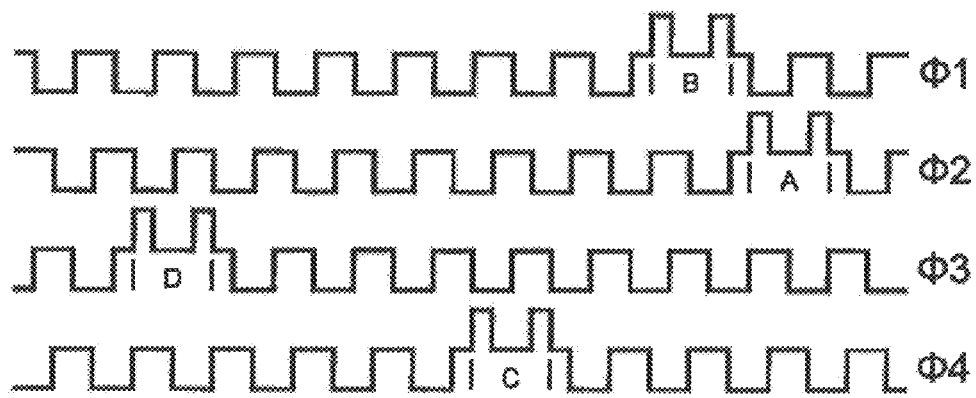
FIG. 11 expands the potential diagrams of FIG. 10 to depict four-phase clocking for multiple ICCD stages including four different rows selected for reset in accordance with various embodiments of the invention.

In FIG. 9, no rows of ICCD stages are selected for possible integrating pixel reset in any of the phases $\Phi 1$ through $\Phi 4$. By contrast, FIG. 10 shows the same five ICCD stages and similar phase clocking as in FIG. 9, but phase $\Phi 2$ is modified in the same manner as in FIG. 5 in order to select integrating pixels one stage from the right for possible reset and phase $\Phi 1$ is modified in order to select integrating pixels approximately two stages from the right for possible reset. For the following discussion, the rightmost stage of FIGS. 9, 10, and 11 is assumed to be in communication with the RCCD and that the integrating pixel is read out of the rightmost stage into the RCCD during phase $\Phi 3$. By selectively operating ICCD gates coincident with phase $\Phi 2$, selected integrating pixels are reset one stage from the right and are subsequently permitted to integrate only during the subsequent sequence of four phases $\Phi 3$, $\Phi 4$, $\Phi 1$, and $\Phi 2$ required to transport the integrating pixels through the rightmost ICCD stage. Similarly, by selectively operating the ICCD gates coincident with phase $\Phi 1$, selected integrating pixels are reset approximately two stages from the right and are subsequently permitted to integrate only during the subsequent nine phases required to transport the integrating pixels through the rightmost two ICCD stages.

Note that in order to permit integrating pixels two stages from the right to be reset independently of integrating pixels one stage from the right, the corresponding row of ICCD stages are selected during different stages. Consequently, as is seen in phase $\Phi 1$ of FIG. 10, the affected ICCD clock lines are not precisely associated with the third stage from the right but are shifted leftward to include one ICCD clock line from the fourth stage.

The ICCD clock lines associated with the selected stage are controlled independently from the other clock lines to permit different voltage levels to be applied to them. In FIG. 10, ICCD clock lines 1A, 2A, 3A, and 4A for the second stage from the right are independent (i.e., independently controllable) from the other ICCD clock lines to permit the second stage from the right to be selected. Similarly, ICCD clock line 4B for the fourth stage from the right and clock lines 1B, 2B, and 3B for the third stage from the right are independent from the other ICCD clock lines. ICCD clock lines 1, 2, 3, and 4 are typically connected together by wiring at the edges of the array of ICCDs in a TDI CCD sensor and are consequently controlled in common for all stages, but the ICCD clock lines 1A, 2A, 3A, 4A, 4B, 1B, 2B, and 3B herein are capable of being controlled independently of ICCD clock lines 1, 2, 3, and 4.

In FIG. 10, phases $\Phi 1$ and $\Phi 2$ select two different points in the ICCDs at which integrating pixels are permitted to be selectively reset. Phases $\Phi 3$ and $\Phi 4$ are similarly modified to select yet another two different points in the ICCDs for selectively resetting integrating pixels. FIG. 11 expands FIG. 10 to show 11 ICCD stages and includes modifications to phases $\Phi 3$ and $\Phi 4$ that permit integrating pixels to be selectively reset at another two points in the ICCDs. In FIG. 11, phase $\Phi 2$ permits integrating pixels to be selectively reset one ICCD stage (four phases) before readout (at label A); phase $\Phi 1$ permits integrating pixels to be selectively reset two and one-quarter ICCD stages (nine phases) before readout (at label B); phase $\Phi 4$ permits integrating pixels to be selectively reset four and one-half ICCD stages (eighteen phases) before readout (at label C); and phase $\Phi 3$ permits integrating pixels to be selectively reset eight and three-quarters ICCD stages (thirty-five phases) before readout (at label D). Assuming the ICCDs in FIG. 11 include 16 stages in total, each integrating pixel delivered to the RCCD integrates light over time selected from four phases, nine phases, eighteen phases, thirty-five phases, or sixty-four phases.

In the embodiment described above, the storage regions produced by the ICCD clock lines, barrier implants, and gates have a limited capacity for holding electrical charge. If the charge capacity of a storage region is exceeded by an integrating pixel's charge packet, the excess charge may spill into adjacent ICCDs or adjacent storage regions, thereby corrupting nearby integrating pixels. This spillover process is typically called "blooming." This is a particular problem for those integrating pixels associated with the brightest regions of the scene. For example, if a particular integrating pixel is selected for reset one ICCD stage before being read out of the ICCD, this means that it requires only one stage of integration to reach a reasonable signal level for measurement. If there are sixteen stages in the complete ICCD, this particular integrating pixel has probably exceeded the charge capacity of the storage regions after integrating for only a few stages. As it continues to collect charge after that point, the integrating pixel may cause blooming.

In order to mitigate the potential for blooming, integrating pixels selected for reset at a particular ICCD stage are also reset at every earlier opportunity. Using the example from the discussion of FIG. 11, if an integrating pixel is selected for reset during phase Φ2 four phases before readout, it is also reset during phase Φ1 nine phases before readout, phase Φ4 eighteen phases before readout, and phase Φ4 thirty-five phases before readout.

Figure 12:
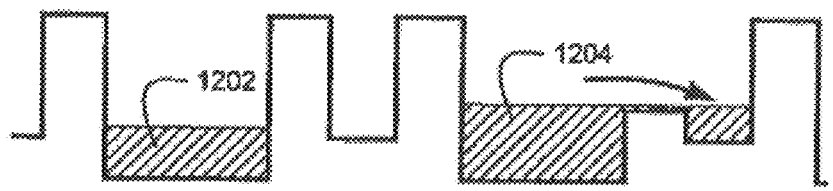
FIG. 12 is a potential diagram for an unselected row of the ICCD stages of FIG. 6 in accordance with various embodiments of the invention.

When an ICCD gate is operated to reset an integrating pixel in a selected row of ICCD stages, the integrating pixels in the unselected rows benefit from a measure of blooming protection provided by the operation of the ICCD gate, as shown in FIG. 12. FIG. 12 has the same potential profile as FIG. 7 showing the potential profile for an unselected row and an unselected ICCD gate (left ICCD) and a selected ICCD gate (right ICCD). However, while the charge packet 1202 in the left ICCD is confined like charge packet 702 in FIG. 7, charge packet 1204 in the right ICCD exceeds the charge capacity of the storage region. Instead of blooming into neighboring storage regions, the excess charge flows into the drain.

Figure 13:
FIG. 13 is a potential diagram for an unselected row of the ICCD stages of FIG. 6 in accordance with various embodiments of the invention.

The ICCD gates are used selectively for blooming control in an embodiment in accordance with the invention. In this case, during a phase when none of the rows of ICCD stages are selected for possible integrating pixel reset, the ICCD gates are driven to a voltage to permit excess charge to be drained from the integrating pixels. FIG. 13 is a modification of FIG. 7 that shows an unselected row with both ICCD gates operated to lower the barriers between the ICCDs and their associated drains. Charge packet 1302 in the left ICCD does not exceed the storage region's charge capacity. Charge packet 1304 in the right ICCD exceeds the storage region's charge capacity, but the excess charge flows harmlessly into the associated drain. In preferred embodiments of the invention, when the ICCD gates are used specifically for blooming control, they need not be driven to the same voltage as when they are used for selective reset of integrating pixels. This use of the ICCD gates for blooming control is analogous to a lateral overflow drain (LOD) for excess charge.

Figure 14:
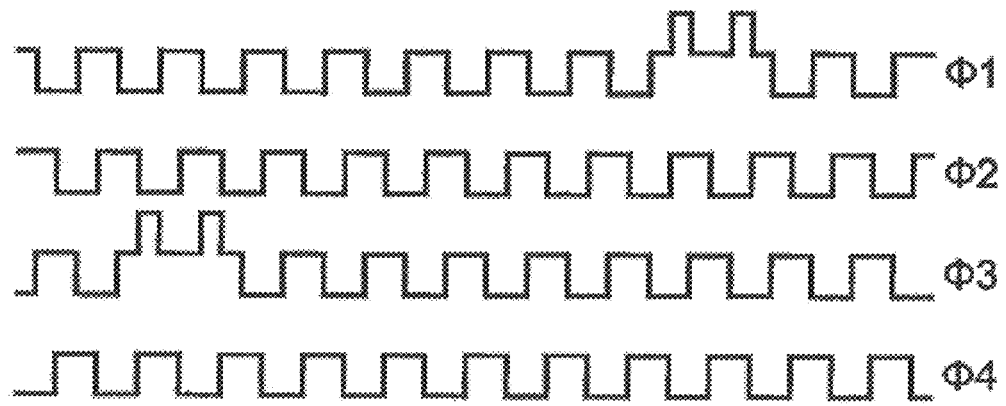
FIG. 14 is a modification of the potential diagrams of FIG. 11 depicting four-phase clocking for multiple ICCD stages including two different rows selected for reset in accordance with various embodiments of the invention.

When the ICCD gates are used for blooming control as described in the previous paragraph, all stages of the ICCDs are in the unselected state to prevent integrating pixels from being inadvertently reset. This is achieved by splitting each phase Φ1 through Φ4 into two parts, one part in which a row of ICCD stages is selected for possible integrating pixel reset and another part in which the row of ICCD stages is deselected and during which the ICCD gates are driven to a voltage appropriate for blooming control. Alternatively, one or more of the phases Φ1 through Φ4 is used to provide an opportunity for blooming control. In FIG. 14, phases Φ1 and Φ3 each select a row of ICCD stages for possible reset of integrating pixels, while no ICCD stages are selected for reset in phases Φ2 and Φ4. During phases Φ2 and Φ4 the ICCD gates are driven to a voltage appropriate for blooming control as shown in FIG. 13. Although this reduces the number of opportunities for integrating pixel reset, it provides an opportunity every other phase to turn on an LOD for all the integrating pixels in order to prevent blooming.

In another embodiment in accordance with the invention, two modes of operation are enabled. In one mode of operation, the ICCD clock lines and gates are operated to provide selective reset of integrating pixels and, optionally, blooming control. In a second mode of operation, the ICCD clock lines are operated only to permit charge transfer along the ICCD; no rows of ICCD stages are selected for possible reset of integrating pixels. Also in the second mode of operation, the ICCD gates optionally are operated in order to enable an LOD for blooming protection. This second mode of operation is useful when the scene to be captured has a low light level and a limited dynamic range, so that all integrating pixels are integrated over the full length of the ICCDs and none are reset. In this case, the charge capacity of the storage regions in the ICCDs is increased by maintaining the voltage of the ICCD gates such that the potential barrier produced by the gate is greater than the barrier produced when the gate is used for selecting an integrating pixel for reset.

In another embodiment in accordance with the invention, the ICCD gates are separated into individual gates that are associated with individual ICCD stages or with individual ICCD clock lines within the individual stages. Control of the gates is provided by circuitry on another integrated circuit that is connected to the gates by wafer-to-wafer or die-to-die bonding. For example, individual ICCD gates are associated with the ICCD clock lines 2 and 3 in FIG. 5 in each stage of each ICCD. During phase Φ2 in FIG. 5, charge packets associated with integrating pixels selected for reset are allowed to flow into the drain associated with the ICCD by operating the corresponding individual gates. Since control of the gates is provided by separate circuitry, the gates may be controlled independently and there is no need for selecting a row of ICCD stages for possible reset of integrating pixels.

Figure 15:
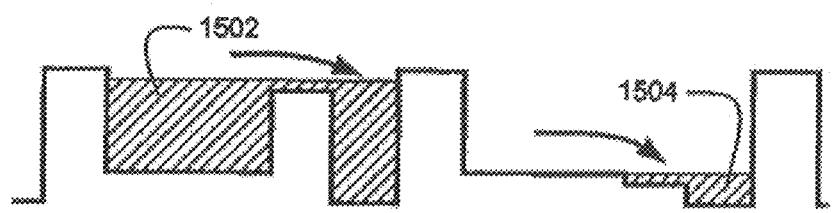
FIG. 15 is a potential diagram for individual gates of ICCD stages in accordance with various embodiments of the invention.

FIG. 15 shows the operation of individual gates for each ICCD as described in the previous paragraph. FIG. 15 is similar to FIG. 8 in that it shows the potential profile across two ICCDs along clock line 2, but clock line 2 is in its conventional storage state, not in a state to select a row of ICCD stages. The individual gate associated with the right ICCD is operated to allow the charge packet 1504 associated with integrating pixel in the right ICCD to flow into the drain. The individual gate associated with the left ICCD is set to a point that provides blooming protection, so that excess charge in the charge packet 1502 is allowed to flow into the drain instead of blooming.

Providing individual gates for the ICCD stages allows increased flexibility in operation. For example, for integrating pixels that are selected to be reset in order to reduce their integration time, those integrating pixels are reset repeatedly as they pass through each stage of the ICCD.

Figure 16:
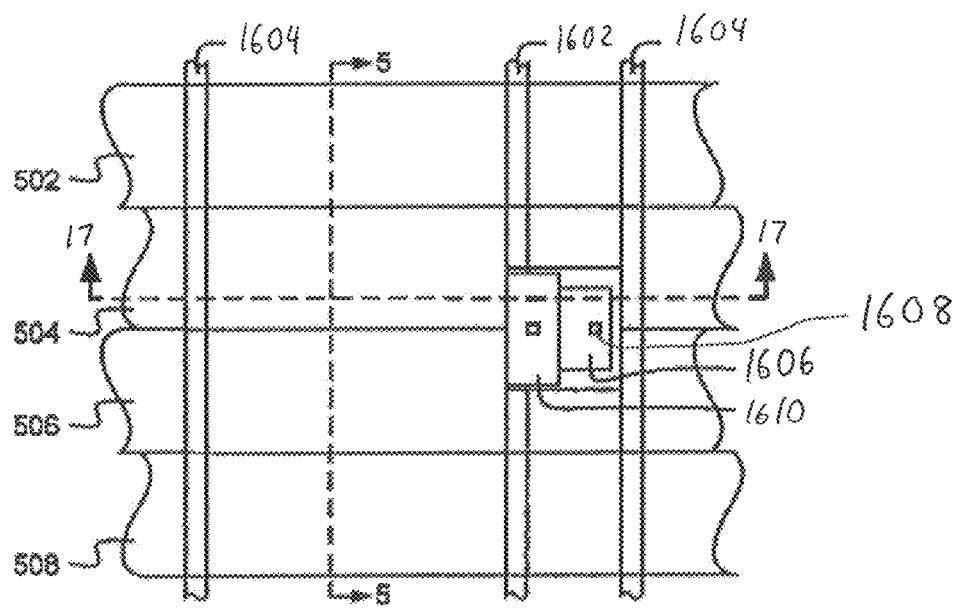
FIG. 16 is a schematic plan view of a portion of an ICCD of a TDI CCD in accordance with various embodiments of the invention.

FIG. 16 is a plan view of portions of ICCDs of a TDI CCD in another embodiment of the present invention. ICCD clock line 1 (502), ICCD clock line 2 (504), ICCD clock line 3 (506) and ICCD clock line 4 (508) are oriented horizontally in FIG. 16, which also depicts channel stops 1602 and 1604. A sense node 1606 (e.g., a floating diffusion node electrically isolated from other nodes in the device and where received photocharge may be converted to a voltage) is located between channel stop 1602 and channel stop 1604.

Figure 17:
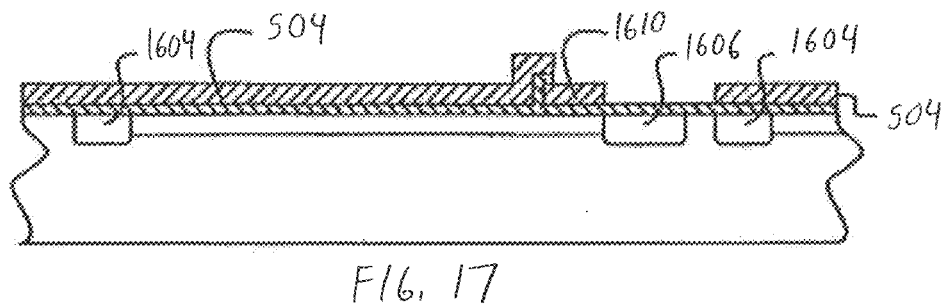
FIG. 17 is a schematic cross section of a horizontal portion of the ICCD of FIG. 16 depicting an ICCD integrating channel with associated structures in accordance with various embodiments of the invention.

A contact 1608 to the sense node 1606 permits the charge in the sense node 1606 to be measured and permits the sense node to be reset by circuitry as will be described below. A gate 1610 is operable in different modes to provide a charge-spillover threshold for the adjacent ICCD integrating channel and to clear charge from the adjacent channel. As in FIG. 4 discussed above, FIG. 5 represents a cross-section of a vertical portion of one of the ICCDs in FIG. 16 as shown by the cut line 5-5 in FIG. 16. FIG. 17 is a cross-section that cuts horizontally through the ICCD of FIG. 16 as shown by cut line 17-17 in FIG. 16.

The cross-section of FIG. 17 cuts along ICCD clock line 2 (504) across an ICCD constructed in accordance with an embodiment of the present invention. Channel stop implants 1604 in FIG. 17 produce potential barriers to separate each ICCD from adjacent ICCDs. Sense node implant 1606 provides a region that is resettable to permit the collection and measurement of spillover charge from the ICCD integrating channel as will be described below in more detail.

Gate 1610 produces a potential region that provides an adjustable barrier between an ICCD integrating channel and its corresponding sense node implant 1606.

FIGS. 18-21 are potential diagrams associated with FIG. 17 for an ICCD in accordance with an embodiment of the invention. In FIGS. 18-21, the ICCD clock lines are driven to produce the potentials associated with potential diagram Φ2 in FIG. 5 so that a storage region to hold a charge packet associated with an integrating pixel is in the ICCD integrating channel adjacent to gate 1610.

Figure 18:
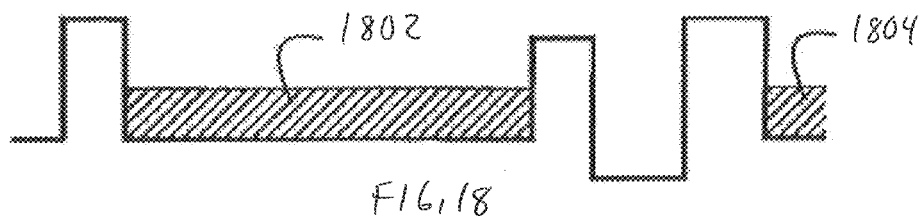
FIG. 18 is a potential diagram for an unselected gate of the ICCD of FIG. 17 in accordance with various embodiments of the invention.

In FIG. 18, the gate 1610 is held in a state that holds integrating pixel charge packet 1802 in the integrating channel of the ICCD. The sense node 1606 adjacent to gate 1610 has been reset by momentarily connecting it to ground in order set the sense node potential to a known state. FIG. 18 also depicts a charge packet 1804 in a neighboring storage region.

Figure 19:
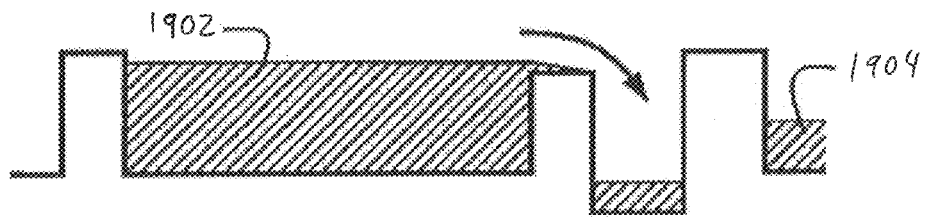
FIG. 19 is a potential diagram depicting charge spillover for an unselected gate of the ICCD of FIG. 17 in accordance with various embodiments of the invention.

The charge packet 1802 is held by the storage region potential profiles produced by the left channel stop 1604, ICCD clock line 1 (502), ICCD clock line 4 (508), channel stop 1602, and gate 1610. The storage region produced by these elements has a limited capacity for holding electrical charge. In FIG. 18, the charge packet 1802 is less than the charge capacity of the storage region. Conversely, the charge packet 1902 in FIG. 19 exceeds the charge capacity of the storage region. The excess charge from charge packet 1902 is allowed by the potential produced by the gate 1610 to spill into the sense node 1606, as shown in FIG. 19 (as shown, neighboring charge packet 1904 is unaffected by such a spill over). Charge that spills into the sense node 1606 is termed "spillover charge." The potential produced by the charge in sense node 1606 may be measured by a measurement circuit, or the sense node 1606 may be reset in order to remove the spillover charge, or both actions may be done in sequence in embodiments of the present invention.

Figure 20:
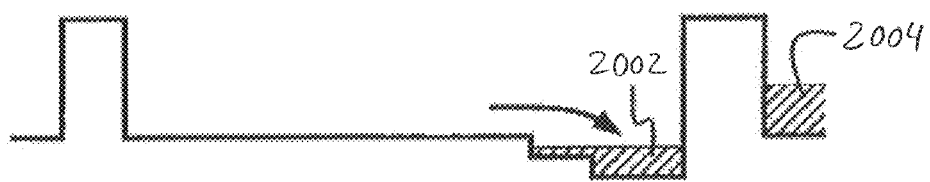
FIG. 20 is a potential diagram depicting charge discharge for a selected gate of the ICCD of FIG. 17 in accordance with various embodiments of the invention.

In FIG. 20 the gate 1610 is operated to eliminate the barrier between the storage region and the sense node 1606, allowing the charge 2002 in the storage region to flow into the sense node 1606 (again with no impact on neighboring charge packet 2004). This permits integration to be restarted for the integrating pixel in the integrating channel of the ICCD. If the sense node has sufficient charge capacity it is capable of holding all of the charge from the storage region. Alternatively, the charge is removed by resetting the sense node.

Figure 21:
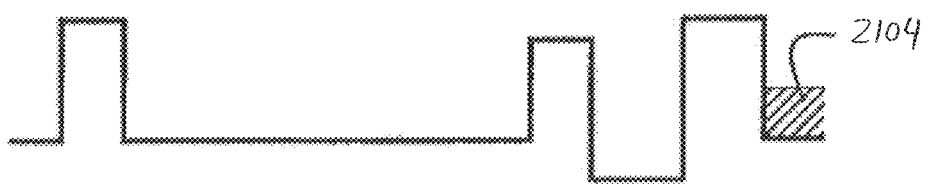
FIG. 21 is a potential diagram depicting an unselected gate and no charge in an ICCD integrating channel of the ICCD of FIG. 17 in accordance with various embodiments of the invention.

FIG. 21 shows the state of the sense node 1606 and the storage region after removing the charge from the storage region and sense node 1606 by operating the gate 1610 as in FIG. 20, resetting the sense node, and restoring the gate 1610 to its barrier state (as in FIGS. 18-20, neighboring charge packet 2104 remains in its storage region). At this point, photocharge begins to collect in the storage region (resulting in, e.g., the state illustrated in FIG. 18). Resetting the integrating pixel in this way effectively reduces the available integration time for the reset integrating pixel to be the time spent in the remaining ICCD stages between where the integrating pixel reset occurred and the end of the ICCD.

By providing each stage of the ICCD with a gate and a sense node as described above, any integrating pixel being clocked along an ICCD may be reset at any ICCD stage by the operation of the gate and sense node as described with respect to FIGS. 18-21. The selective reset of integrating pixels provided by this arrangement enables integrating pixels associated with bright regions of the scene to be reset at a point close to the end of the ICCD, thereby permitting them to have a short effective integration time. In a similar fashion, integrating pixels associated with middle ranges of scene brightness are enabled to be reset in the middle of the ICCD, permitting them to have a medium length effective integration time. Integrating pixels associated with dark areas of the scene do not have to be reset at all, permitting them to have the maximum integration time allowed by all stages of the ICCD. This has the effect of significantly increasing the dynamic range of the TDI image sensor.

The embodiment described above provides the advantage of increased dynamic range without the shortcomings of earlier approaches. For example, compared to conventional charge measurement circuitry, the gate and sense node associated with an ICCD stage are compact structures. All of the ICCD stages are identical in the disclosed embodiment, unlike the conventional stages that incorporate specialized charge measurement and discharge circuitry. Embodiments of the present invention also do not require the placement of a contact in the ICCD for charge measurement, thereby eliminating the possibility of disrupting the integrating pixel with dark current or other undesirable effects. Finally, since the gate and sense node are externally controllable, the entity that controls these elements and thereby causes the reset of integrating pixels has knowledge of which integrating pixels were reset and at which ICCD stage they were reset. Consequently, in contrast to the output pixels produced by conventional sensors, there is no ambiguity regarding the output pixels: since the reset conditions for a given integrating pixel are known, the integration time for the corresponding output pixel is also known.

As was described previously with respect to FIGS. 18 and 19, the storage regions produced by the ICCD clock lines, barrier implants, and gates have a limited capacity for holding electrical charge. If the charge capacity of a storage region is exceeded by an integrating pixel's charge packet, the excess charge may spill into adjacent ICCDs or adjacent storage regions, thereby corrupting nearby integrating pixels (which, as detailed above, is typically referred to as "blooming"). This is a particular problem for those integrating pixels associated with the brightest regions of the scene. For example, if a particular integrating pixel is selected for reset one ICCD stage before being read out of the ICCD, this means that it requires only one stage of integration to reach a reasonable signal level for measurement. If there are sixteen stages in the complete ICCD, this particular integrating pixel has probably exceeded the charge capacity of the storage regions after integrating for only a few stages. As it continues to collect charge after that point, the integrating pixel may cause blooming.

In order to mitigate the potential for blooming, integrating pixels selected for reset at a particular ICCD stage may be reset at every earlier opportunity, as also described above. For example, if an integrating pixel is reset one ICCD stage before readout, it is also reset in every earlier ICCD stage it passes through that includes a gate and sense node. Alternatively, the gate is used selectively for blooming control in an embodiment in accordance with the invention. In this case, the gate is set to a level that sets a threshold for charge that is lower than the other storage region barriers, causing excess charge to spill preferentially over the gate barrier into the sense node. This use of the gate for blooming control produces a lateral overflow drain for excess charge. Note that the threshold for spillover charge is adjustable depending on the voltage applied to the gate.

The discussion to this point relates to using the gate and sense node for resetting an integrating pixel or for providing blooming protection. The gate and sense node also provide a way to measure the spillover charge. This measurement is used to make decisions regarding which integrating pixels to reset and at which ICCD stage to set them. Alternatively, the spillover charge measurements are used to augment the measured integrating pixels.

Figure 22:
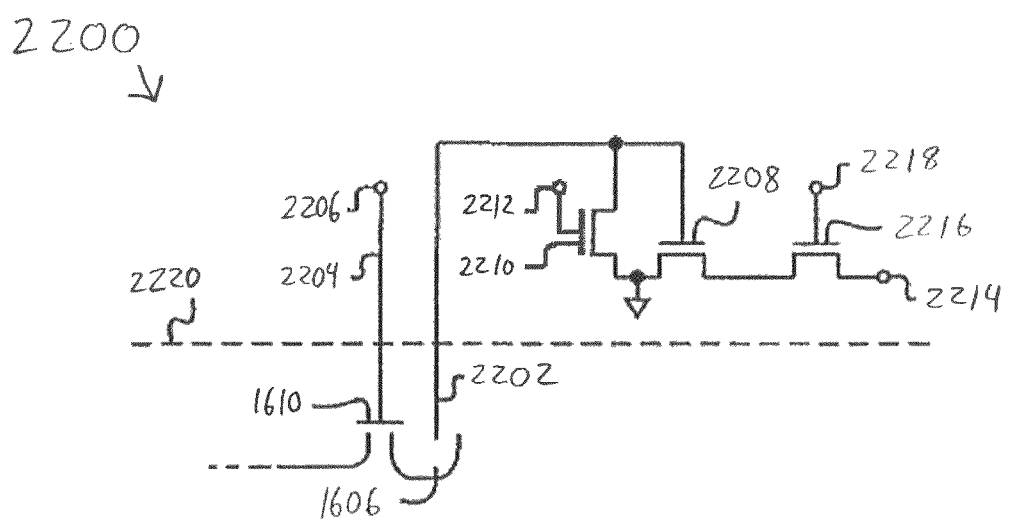
FIG. 22 is a circuit diagram of a spillover charge-measurement circuit in accordance with various embodiments of the invention.

FIG. 22 shows a spillover charge measurement circuit 2200 in accordance with an embodiment of the invention. Sense node 1606 is electrically connected to reset and readout circuitry by a conductor 2202. The voltage of gate 1610 is controlled by a conductor 2204 and a terminal 2206. The sense node 1606 is connected to a source follower 2208. A reset gate 2210 is operated by a terminal 2212 in order to connect the sense node 1606 to ground to establish a known reset state for the sense node 1606. Sense node 1606 converts spillover charge into a voltage, a process that depends on the capacitance of the sense node 1606: a small capacitance produces a higher voltage than a large capacitance for the same amount of charge. The voltage at the sense node 1606 is applied to the gate of source follower 2208 in order to buffer the source follower voltage and provide drive for an output terminal 2214. Optional select gate 2216 is operated by a terminal 2218 in order to either connect source follower 2208 to commonly used readout circuitry or to isolate it from other source followers that share the same readout circuitry. The circuitry 2200 may be fabricated in the same substrate as the TDI CCD and associated gate and sense node with which it is associated, or it may be fabricated in a different substrate that is electrically connected to the gate and sense node in the TDI CCD substrate by conductors 2204 and 2202 (as indicated by interface 2220). Such connection may be achieved by wafer-to-wafer or die-to-die bonding in ways well-known to those skilled in the art.

Measurement of spillover charge begins with gate 2216 being turned on by terminal 2218 to connect source follower 2208 to output terminal 2214. Sense node 1606 is reset to a known state by momentarily turning on reset gate 2210 with terminal 2212. After sense node 1606 is reset and reset gate 2210 is turned off, the voltage at output gate 2214 is sampled and held; this is the reset sample. After a period of time to collect spillover charge in the sense node 1606, the voltage at output gate 2214 is sampled and held again; this is the signal sample. The measurement of the spillover charge is the difference between the signal sample and the reset sample. The reset, reset sample, spillover accumulation time, and signal sample may all occur during phase $\Phi 2$ (FIGS. 5, 16, and 17), or reset and reset sample may occur during phase $\Phi 4$ when the gate is adjacent to a barrier region and signal sample may occur during subsequent phase $\Phi 2$ when the gate is adjacent to a storage region. Although the described embodiment of spillover charge measurement employs correlated double-sampling in a manner well-known to those skilled in the art, a measurement may also be done with only the signal sample, although the result may have somewhat higher error. The capacitance of the sense node 1606 may be made very small so small amounts of spillover charge cause large voltage swings at the sense node 1606; this effectively provides a high gain measurement of the spillover charge.

The measured spillover charge is used for any of several purposes in embodiments in accordance with the invention. For example, the charge spillover measurements associated with the passage of an integrating pixel along the ICCD may be stored and used along with the measured integrating pixel to determine a final extended dynamic range pixel. Integrating pixels associated with dark areas of a scene to be captured will typically have no spillover charge, so the spillover charge measurements will be zero and the measured integrating pixel alone provides the result. Integrating pixels associated with bright areas of the scene may have significant amounts of spillover charge beginning soon after the integrating pixels begin travelling along the ICCD. The combination of the spillover charge measurements for a brightly illuminated integrating pixel and the measurement of the integrating pixel itself provides the final pixel value. Integrating pixels associated with mid-range brightness areas of the scene will typically have modest amounts of charge spillover that begins after some number of ICCD stages have been passed by the integrating pixels. In this case, the non-zero spillover charge measurements for a mid-range illuminated integrating pixel and the measurement of the integrating pixel itself provides the final pixel value. In order to avoid accumulating noise from spillover charge measurements in the determination of the final pixel, a threshold may be applied to the spillover charge measurements to determine whether or not a particular measurement should be used.

The spillover charge measurement may also be utilized to determine which integrating pixels to reset and at which stage of the ICCD to reset them. For example, if spillover charge is detected after an integrating pixel has traversed the first two stages of an ICCD, then the light level for that integrating pixel is such that the integrating pixel requires only a single stage of integration. Consequently, the integrating pixel is reset through every subsequent stage of the ICCD until it reaches the final stage, at which point it is allowed to integrate through the final stage. Similarly, if spillover charge is detected after an integrating pixel has traversed the first six stages of an ICCD, then the light level for that integrating pixel is such that the integrating pixel will produce a strong, but not overflowing, signal level after five stages of integration. In this case, the integrating pixel is reset through every subsequent stage of the ICCD until it reaches the fifth to last stage, at which point it is allowed to integrate through the final five stages. Note that the number of stages of integration determined and used for each integrating pixel is reported by the entity that makes the determination (e.g., the controller) so that it may be used along with the measured integrating pixel to product the final pixel.

When charge spillover detection is used to determine the number of stages used for integrating each integrating pixel as described in the previous paragraph, an issue may arise if spillover is detected only after an integrating pixel passes the halfway point in the ICCD. In this case, the required number of stages for integration is less than the full number in the ICCD but more than the number of stages already passed by the integrating pixel. This is addressed by adjusting the potential produced by the gate to allow spillover at a lower level of charge in earlier stages of the ICCD. For example, by setting the gate threshold after the first stage of a 16-stage ICCD to $\frac{1}{16}$ the maximum charge capacity of a storage region of the ICCD, any integrating pixels that do not cause charge spillover of that lower gate threshold can integrate for the full 16 stages without causing charge spillover. If charge spillover occurs, the measured charge spillover is used to determine how many stages of integration are required, provided the charge spillover does not saturate the sense node 1606. If the charge spillover saturates the sense node, then the next stage of the ICCD has its gate adjusted to allow spillover at a higher amount of charge, thereby refining the measurement of spillover charge for those integrating pixels that saturated the measurement at the first stage. Such adjustment of gate thresholds and detecting and measuring spillover charge may be used in a successive-approximation fashion to determine the number of final stages through which each integrating pixel should be run, resetting the integrating pixel up until that point. Variations in gate thresholds due to manufacturing or other variations may require calibration or application of calculation thresholds when using the spillover charge measurements in determining a final pixel value or when used for spillover charge detection. Although the transistors and reference levels described above have been NMOS transistors and reference levels suitable for operation with an electron-collecting CCD arrangement, PMOS transistors and corresponding reference levels may be used with a hole-collecting CCD arrangement.

Although mechanisms for determining which integrating pixels to reset and at which ICCD stage to reset them have been described above, the determination may also be based in whole or in part on a prediction of scene content. The prediction may be made either because the scene content is well controlled and may be accurately anticipated or because an earlier image of the scene has been captured and upon which the prediction is based. Alternatively, a separate sensor may be arranged preceding the TDI sensor in the scanning process, thereby providing a captured image of the scene that is closely followed by capture of the same scene by the TDI sensor. The earlier captured image of the scene may have a reduced dynamic range or increased noise compared to the TDI capture, but the earlier captured image is sufficient to determine which integrating pixels to reset and at which ICCD stage to reset them in the TDI capture. There may be a one-to-one correspondence between pixels in the earlier captured image and the integrating pixels in the TDI capture, allowing the determination regarding integrating pixel reset to be made based on the corresponding pixel in the earlier captured image. Alternatively, the earlier captured image may have multiple pixels corresponding to the integrating pixels in the TDI capture, allowing the determination regarding integrating pixel reset to be made on the basis of several corresponding pixels in the earlier captured image. In yet another alternative, each pixel of the earlier captured image may correspond to several integrating pixels in the TDI capture, with the determination of integrating pixel reset being made collectively for small clusters of integrating pixels or being made on the basis of an interpolation of the pixels of the earlier captured image.

Figure 23:
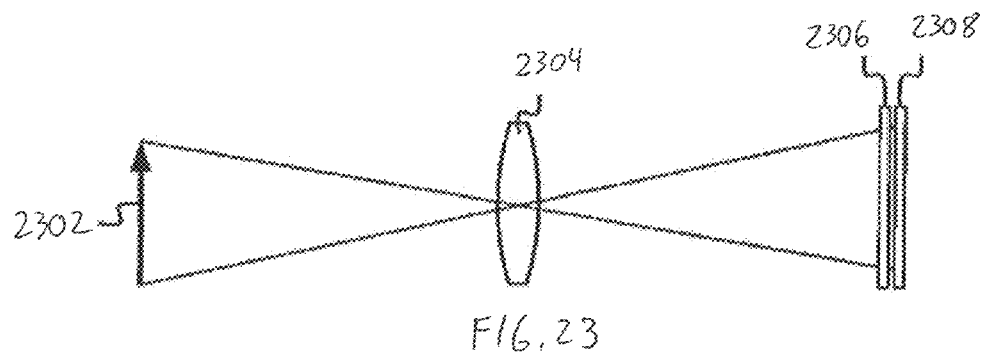
FIG. 23 is a schematic cross-section of a system in which a travelling optical mask is in virtual contact with a sensor in accordance with various embodiments of the invention.

FIG. 23 illustrates yet another embodiment in accordance with the invention in which the dynamic range of the TDI CCD sensor is enhanced via the selective blocking of portions of the scene to be imaged (preferably bright areas of the scene). In FIG. 23, light from a scene element 2302 is collected by an optical system 2304 in order to produce an optical image on the face of a transmissive optical mask array 2306. The optical mask array 2306 may be either in contact with or in very close proximity to a TDI image sensor 2308. The optical mask array 2306 may be an array of switchable optical elements, each of which may be switched between an optically transmitting state and a partially or completely optically blocking state. Since TDI image sensor 2308 is used, the optical image moves with respect to the TDI image sensor 2308 and the optical mask array 2306, and the TDI image sensor 2308 is clocked concurrently with the movement of the optical image. Simultaneously with the clocking of the TDI image sensor 2308 and the movement of the optical image, the switchable optical elements of the optical mask array 2306 are switched in order to match the motion of the optical image and the clocking of the TDI image sensor 2308. In this manner, the optically attenuating or blocking mask 2306 may be utilized to track a bright area of the scene, thereby preventing at least a portion of the bright light from reaching the TDI image sensor 2308. For example, the light from a bright area of the scene may be controlled by using the switchable optical elements of optical mask array 2306 to provide a synchronously travelling optical mask that blocks light from reaching the TDI image sensor 2308 for part of the time that the corresponding integrating pixels in the TDI image sensor 2308 are being clocked through the ICCDs of the TDI image sensor 2308. Knowledge of which pixels in the image captured by the TDI image sensor were affected by the optical mask is combined with the pixels of the captured image in order to provide an extended dynamic range image. (That is, the level of light attenuation due to the mask array 2306 may be utilized to determine the actual brightness level of the masked pixel after image capture.) In various embodiments of the present invention, the optical mask array 2306 is partially attenuating for the full time that corresponding integrating pixels travel along the ICCDs of the TDI image sensor, fully attenuating for part of the travel time, or a combination of partially attenuating and fully attenuating for the travel time.

The optical mask array 2306 in FIG. 23 may be fabricated in any of several different ways. In one embodiment of the present invention, the optical mask array 2306 is made by employing liquid crystal technology. The liquid crystal material, in conjunction with optical polarizers and X-Y addressing and control schemes commonly used for liquid-crystal-based displays, provides a traveling attenuator that is adjustable over a wide range of attenuation. In another embodiment of the present invention, optical mask array 2306 is made using micro-electromechanical systems (MEMS) to provide individual mechanical shutters that open and close to selectively allow or prevent light from reaching the TDI sensor 2308.

The individual switchable optical elements in the optical mask array 2306 may have a one-to-one correspondence with CCD elements in the TDI image sensor 2308, there may be multiple switchable optical elements in the optical mask array 2306 for each CCD element, or there may be multiple CCD elements for each switchable optical element. Additionally, the optical mask array 2306 may be in intimate contact with the TDI image sensor 2308 to cast sharply defined images of the switchable optical elements onto the surface of the TDI image sensor, or it may be placed in a slightly defocused position in order to soften the edges between the switchable optical elements.

Figure 24:
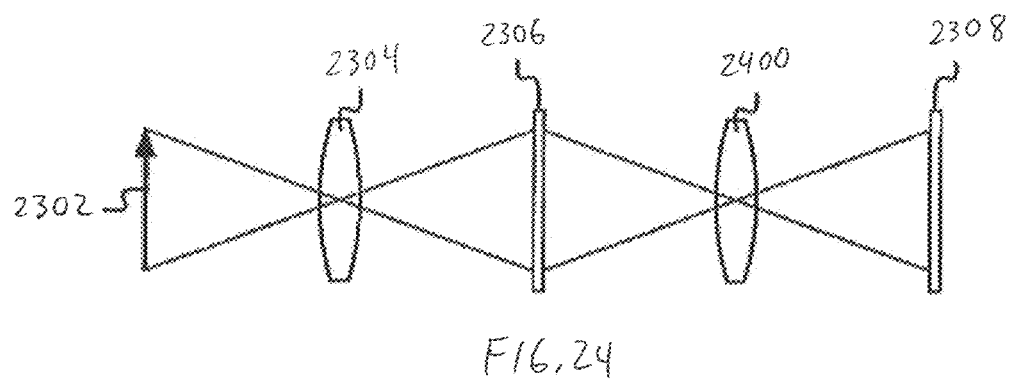
FIG. 24 is a schematic cross-section of a system in which an image passing through a travelling optical mask is relayed to a sensor in accordance with various embodiments of the invention.

Another embodiment of the present invention that employs an alternative optical arrangement is shown in FIG. 24. In this arrangement, light from the scene element 2302 is collected by optical system 2304 in order to produce an optical image on the face of transmissive optical mask array 2306. The image transmitted through the optical mask is then collected by a relay lens 2400 in order to produce a masked optical image on the face of the TDI image sensor 2308. In other regards this arrangement typically operates the same way as the arrangement of FIG. 23.

Figure 25:
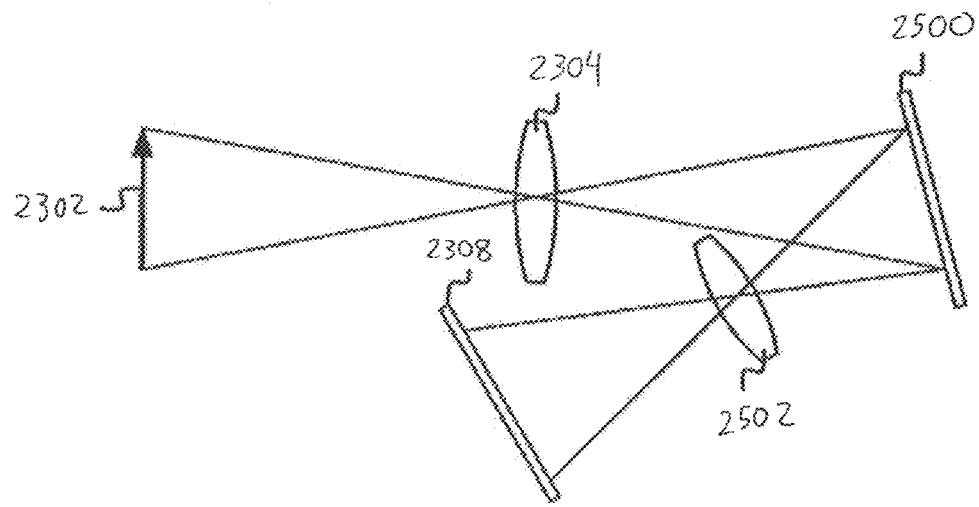
FIG. 25 is a schematic cross-section of a system in which an image reflected from a travelling optical mask is relayed to a sensor in accordance with various embodiments of the invention.

Another embodiment of the present invention that employs an alternative optical arrangement is shown in FIG. 25. In this arrangement, light from the scene element 2302 is collected by optical system 2304 in order to produce an optical image on the face of a reflective optical mask array 2500. The image reflected by the optical mask is then collected by relay lens 2502 in order to produce a masked optical image on the face of the TDI image sensor 2308. In one embodiment of the present invention, the reflective optical mask array 2500 is fabricated by placing a reflective surface (e.g., a mirror) behind the transmissive optical mask array 2306 of FIGS. 23 and 24. In another embodiment, the reflective optical mask array 2500 employs a micro-mirror array (another type of MEMS structure) in which the array elements are individually switchable either to reflect light toward the TDI image sensor 2308 or to reflect light away from the TDI image sensor 2308.

As mentioned previously, the determination of the integrating pixels to be optically masked may be based a prediction of scene content. The prediction may be made either because the scene content is well controlled and may be accurately anticipated or because an earlier image of the scene has been captured and upon which the prediction is based. Alternatively, a separate sensor may be arranged preceding the TDI sensor in the scanning process, thereby providing a captured image of the scene that is closely followed by capture of the same scene by the TDI sensor. The earlier captured image of the scene may have a reduced dynamic range or increased noise compared to the TDI capture, but the earlier captured image is sufficient to determine which integrating pixels require optical masking. There may be a one-to-one correspondence between pixels in the earlier captured image and the integrating pixels in the TDI capture, allowing the determination regarding optical masking to be made based on the corresponding pixel in the earlier captured image. Alternatively, the earlier captured image may have multiple pixels corresponding to the integrating pixels in the TDI capture, allowing the determination regarding optical masking to be made on the basis of several corresponding pixels in the earlier captured image. In yet another alternative, each pixel of the earlier captured image may correspond to several integrating pixels in the TDI capture, with the determination of optical masking being made collectively for small clusters of integrating pixels or being made on the basis of an interpolation of the pixels of the earlier captured image.

Figure 26:
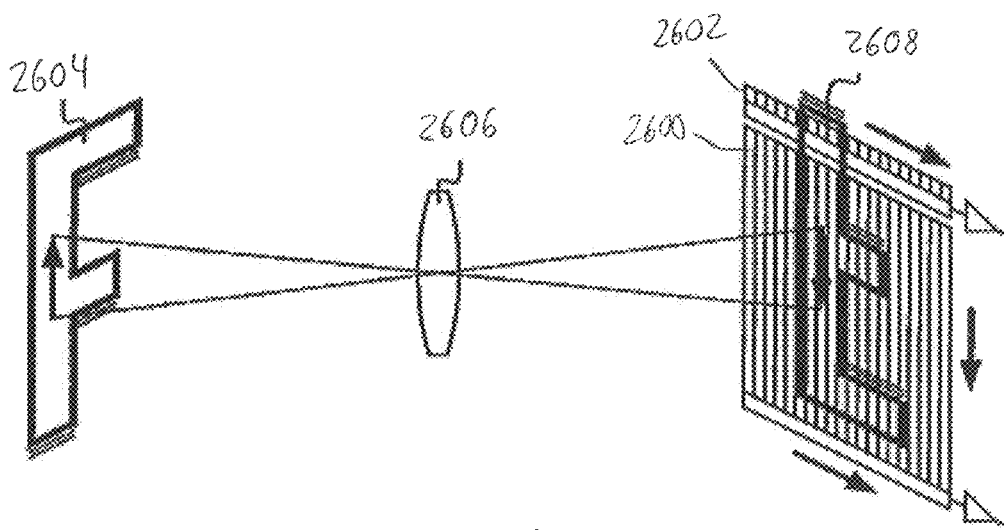
FIG. 26 illustrates an exemplary operation mode of a TDI sensor with a leading sensor in accordance with various embodiments of the invention.

The sensor that provides the earlier captured image generally precedes the TDI image sensor in the scanning process, and may therefore be termed a "leading sensor." FIG. 26 depicts a TDI CCD image sensor 2600 with a leading linear array image sensor 2602. Light from a scene element 2604 is collected by an optical system 2606 in order to produce an optical image 2608 that extends across the face of the TDI image sensor 2600 and also on the leading linear array image sensor 2602. Scene element 2604 moves vertically upward with respect to optical system 2606 and the two image sensors 2600, 2602, causing corresponding optical image 2608 to move vertically downward across the linear array image sensor 2602 and the TDI image sensor 2600. Since each element of the image is first encountered by the leading image sensor 2602, the captured image from the leading image sensor 2602 may be utilized to make decisions regarding the operation of the TDI image sensor 2600 and/or an optical mask utilized therewith, as discussed above.

The leading image sensor, in addition to its use as a predictive sensor, is used in one embodiment of the invention to provide additional scene information. For example, the additional scene information includes color information if the TDI sensor does not capture color information. (For example, portions of the leading sensor may incorporate color filters each passing light of a particular color or portion of the electromagnetic spectrum, and the photocharge generated therein may thus provide color information for the captured scene, and the TDI sensor may not incorporate such color filters and may thus collect only monochrome intensity levels related to the scene.) By way of example, the leading image sensor may be a linear array sensor, a multiple linear array sensor, an area array sensor, or a TDI sensor. Also by way of example, the leading image sensor may be separate from the associated TDI sensor or may be integrated into the same integrated circuit substrate as the TDI sensor.

A trailing image sensor, one that is preceded in the scanning process by the TDI sensor (but otherwise resembles the leading image sensor described above), may be used to provide a later captured image. The later image may be used in conjunction with an earlier captured image to determine that no significant changes occurred in the scene between the time the earlier captured image was captured and the time that later captured image was captured. Changes detected in the scene between the earlier and later captured images may be used to flag pixels in the TDI captured image as potentially being under- or over-exposed because of an incorrect TDI captured image prediction and/or because of an incorrect optical masking determination based on the earlier captured image.

The foregoing description of a TDI CCD with selective pixel integration period will be understood by one skilled in the art. Variations and modifications may be effected within the spirit and scope of the invention. By way of example, a different number of phases may be used to clock charge packets along the ICCD, barrier implants may be used in the ICCDs to permit two-phase operation, and implants may be used to adjust gate threshold levels. In another example, the RCCD is replaced with alternative readout circuitry, either on the same substrate as the ICCDs or on a separate substrate. All of these variations and others contemplated or made by one skilled in the art remain within the scope of the invention.

The terms and expressions employed herein are used as terms and expressions of description and not of limitation, and there is no intention, in the use of such terms and expressions, of excluding any equivalents of the features shown and described or portions thereof. In addition, having described certain embodiments of the invention, it will be apparent to those of ordinary skill in the art that other embodiments incorporating the concepts disclosed herein may be used without departing from the spirit and scope of the invention. Accordingly, the described embodiments are to be considered in all respects as only illustrative and not restrictive.

What is claimed is:

1. An imaging system comprising:
   a time-delay-and-integrate (TDI) image sensor comprising (i) a plurality of identical integrating CCDs (ICCDs), arranged in parallel and abutting each other, that accumulate photocharge in response to exposure to light, (ii) electrically coupled to the plurality of ICCDs, a readout CCD (RCCD) for receiving photocharge from the plurality of ICCDs, and (iii) electrically coupled to the RCCD, readout circuitry for converting charge received from the RCCD into voltage;
   an optical system for receiving light from a scene to be imaged and projecting it on the plurality of ICCDs; and
   wherein each ICCD comprises (i) a plurality of independently controllable stages, (ii) a photosensitive channel for containing photocharge and a channel stop to produce a barrier to separate each ICCD from adjacent ICCDs, (iii) for each of a plurality of charge collection regions, a sense node located between the photosensitive channel and the channel stop for measuring photocharge received thereby from the photosensitive channel, and (iv) for each of the plurality of charge collection regions, a gate for controlling flow of photocharge from the photosensitive channel to the sense node, and the imaging system comprises, for each charge collection region, a spillover charge measurement circuit to alternatively reset the sense node and measure a charge in the sense node of an associated charge collection region.

2. The imaging system of claim 1, further comprising a plurality of clock lines (i) disposed substantially perpendicular to the ICCDs and (ii) each controlling a particular stage common to all of the ICCDs.

3. The imaging system of claim 1, further comprising a control system configured to (i) measure spillover charge received by the sense node from the channel and (ii) reset the sense node by applying a bias thereto to remove the spillover charge therefrom.

4. The imaging system of claim 3, further comprising a control system configured to measure photocharge received by the sense node from the channel.

5. The imaging system of claim 4, wherein the control system is configured to reset a selected stage based at least in part on a previously captured image.

6. An imaging device comprising:
a time-delay-and-integrate (TDI) image sensor comprising a plurality of integrating CCDs (ICCDs) arranged in parallel in a first direction, each of the plurality of ICCDs moving charge from a plurality of charge collection regions to corresponding adjacent charge collection regions in a second direction using a plurality of phase clock signals, comprising a plurality of phase clock signal conductors extending across the plurality of ICCDs in the first direction; and
a readout CCD (RCCD) for receiving photocharge from the plurality of ICCDs,
wherein each of the plurality of ICCDs further comprises, for each of the plurality of charge collection regions:
a channel region;
a sense node located between the charge collection region and a channel stop for measuring photocharge received thereby from the channel region;
a gate for controlling flow of photocharge from the channel region to the sense node; and
a spillover charge measurement circuit to alternatively reset the sense node and measure a charge in the sense node.

7. The imaging device of claim 6, wherein the sense node comprises a floating diffusion.

8. The imaging device of claim 6, wherein each of the plurality of ICCDs further comprises, under a corresponding phase clock signal conductor:
a first barrier region at a first side of the channel region; and
a second barrier region at a second side of the sense node.

9. The imaging device of claim 8, wherein the second barrier region of a first one of the plurality of ICCDs forms the first barrier region of a second one of the plurality of ICCDs.

10. The imaging device of claim 6, further comprising:
a readout CCD (RCCD) coupled to outputs of the plurality of ICCDs; and
a charge measurement and amplifier circuit coupled to the output of the RCCD.

11. The imaging device of claim 6, further comprising:
an optical system for receiving light from a scene to be imaged and projecting it on the plurality of ICCDs.

12. A method of image capture utilizing a time-delay-integrate (TDI) image sensor comprising a plurality of integrating CCDs (ICCDs) arranged in parallel in a first direction, each of the plurality of ICCDs moving charge from a plurality of charge collection regions to corresponding adjacent charge collection regions in a second direction using a plurality of phase clock signals, the method comprising:
routing a plurality of phase clock signal conductors corresponding to the plurality of phase clock signals across the plurality of ICCDs in the first direction used in the TDI image sensor, thereby forming rows of charge collection regions;
reading out charge from the plurality of ICCDs using a readout CCD (RCCD); and
for each of the plurality of charge collection regions in the plurality of ICCDs:
resetting a sense node;
collecting charge in a charge collection region of a first row of a first ICCD;
transferring spillover charge from the charge collection region to the sense node; and
converting the spillover charge in the sense node to a voltage.

\* \* \* \* \*